United States Patent
Zhang et al.

(10) Patent No.: US 10,149,194 B2
(45) Date of Patent: Dec. 4, 2018

(54) METHOD, APPARATUS, AND SYSTEM FOR ESTABLISHING BEARER

(71) Applicant: Huawei Technologies Co., Ltd., Shenzhen, Guangdong (CN)

(72) Inventors: Tao Zhang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 14/801,020

(22) Filed: Jul. 16, 2015

(65) Prior Publication Data

US 2015/0327111 A1 Nov. 12, 2015

Related U.S. Application Data

(63) Continuation of application No. PCT/CN2013/070681, filed on Jan. 18, 2013.

(51) Int. Cl.
*H04W 28/02* (2009.01)
*H04L 29/06* (2006.01)
(Continued)

(52) U.S. Cl.
CPC ....... *H04W 28/0252* (2013.01); *H04L 65/102* (2013.01); *H04W 8/26* (2013.01); *H04W 76/12* (2018.02); *H04W 88/16* (2013.01)

(58) Field of Classification Search
CPC .. H04W 28/0252; H04W 76/02; H04L 65/102
See application file for complete search history.

(56) References Cited

U.S. PATENT DOCUMENTS

2011/0075557 A1 3/2011 Chowdhury et al.
2011/0105132 A1 5/2011 Vasudevan et al.
(Continued)

FOREIGN PATENT DOCUMENTS

CN 101729337 A 6/2010
CN 101873716 A 10/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.9.0, Dec. 2012, 194 pages.
(Continued)

*Primary Examiner* — Derrick W Ferris
*Assistant Examiner* — Farhad Ali

(57) ABSTRACT

A method, apparatus and system for establishing a bearer are provided. The method includes: after a core network node initiates a bearer setup request, receiving, by a gateway node, a first identifier and a third identifier that are sent by a macro access network node, where the first identifier is used to enable the core network node to identify uplink user data forwarded by the gateway node, and the third identifier is used to enable a first small access network node to identify downlink user data forwarded by the gateway node; and sending, by the gateway node, a second identifier and a fourth identifier to the macro access network node.

19 Claims, 10 Drawing Sheets

(51) Int. Cl.
    *H04W 76/12*    (2018.01)
    *H04W 8/26*     (2009.01)
    *H04W 88/16*    (2009.01)

(56)            References Cited

U.S. PATENT DOCUMENTS

2012/0258767 A1*  10/2012  Liang ................... H04W 8/082
                                                        455/525
2012/0302213 A1   11/2012  Shu et al.
2013/0003697 A1*   1/2013  Adjakple .......... H04W 36/0011
                                                        370/331

FOREIGN PATENT DOCUMENTS

| CN | 102104867 A      | 6/2011 |
| CN | 102149172 A      | 8/2011 |
| CN | 102355647 A      | 2/2012 |
| EP | 2076069 A1       | 7/2009 |
| EP | 2 445 261 A1     | 4/2012 |
| WO | WO 2009/080601 A1| 7/2009 |

OTHER PUBLICATIONS

"3rd Generation Partnership Project; Technical Specification Group Radio Access Network; Evolved Universal Terrestrial Radio Access (E-UTRA); Mobility enhancements in heterogeneous networks (Release 11)", 3GPP TR 36.839 V11.1.0, Dec. 2012, 53 pages.

* cited by examiner

METHOD, APPARATUS, AND SYSTEM FOR ESTABLISHING BEARER

CROSS-REFERENCE TO RELATED APPLICATIONS

This application is a continuation of International Application No. PCT/CN2013/070681, filed on Jan. 18, 2013, which is hereby incorporated by reference in its entirety.

TECHNICAL FIELD

The present invention relates to the field of communications, and in particular, to a method, an apparatus, and a system for establishing a bearer.

BACKGROUND

In a network deployment scenario, there are two types of network nodes, which are a E-UTRAN NodeB (eNB) and a small cell node (SCN). The eNB and the SCN each control one or more cells. A frequency used by a cell served by the eNB may be different from a frequency used by a cell of the SCN. The cell of the eNB uses a frequency F1, and the cell of the SCN uses a frequency F2. The eNB has large cell coverage, and may be referred to as a macro access network node. The SCN has small cell coverage, and may be referred to as a small access network node. Within coverage of a macro access network node or in the vicinity of the macro access network node, there may be multiple small access network nodes. Small access network nodes are generally deployed in service hotspot areas to help a macro access network node to offload services in those areas.

According to a quantity of deployed small access network nodes, deployment scenarios may be classified into two types: sparse deployment and dense deployment. In a sparse deployment scenario, the quantity of small access network nodes is small, and only one or several SCNs may be deployed in one service hotspot area. In a dense deployment scenario, the quantity of small access network nodes is large, and a large quantity of SCNs may be deployed in one service hotspot area.

In addition, service hotspot areas are generally discontinuous; therefore, generally coverage of small access network nodes is also discontinuous. One service hotspot area is covered by a cluster of small access network nodes. Small access network nodes in a same cluster are generally neighboring to each other, while different clusters of small access network nodes are probably not neighboring to each other.

Referring to FIG. 1, in an existing network architecture, an SCN is connected to an eNB through an X interface, and there is no direct interface between the SCN and core network nodes. The core network nodes herein include a mobility management entity (Mobility Management Entity, MME) and a serving gateway (Serving GateWay, SGW). The X interface may be a new interface, an existing S1 or X2 interface, or the like. The eNB is connected to the MME through an S1-c interface, and connected to the SGW through an S1-u interface. The MME is connected to the SGW through an S11 interface.

In the prior art, the eNB is responsible for forwarding to the SCN downlink user data sent by the SGW, and responsible for forwarding to the SGW uplink user data sent by the SCN. In a sparse deployment scenario, the quantity of SCNs deployed within coverage of one eNB is limited, and the architecture may work properly. However, as the quantity of SCNs deployed in a network increases, the sparse deployment scenario may gradually evolve into a dense deployment scenario. In the dense deployment scenario, the quantity of SCNs deployed within coverage of one eNB may be large, and consequently, the following problems are caused to the existing architecture.

1. As the quantity of SCNs increases, data to be forwarded by the eNB increases, and finally, the eNB may be unable to work properly due to too heavy load.

2. As the quantity of SCNs increases, data transmitted over a connection between the eNB and the SGW also increases, and finally, congestion occurs on the connection.

SUMMARY

Embodiments of the present invention provide a method, an apparatus, and a system for establishing a bearer, which are used to reduce an overhead of processing user data by a macro access network node in a network scenario in which both the macro access network node and a small access network node are deployed.

According to a first aspect, an embodiment of the present invention provides a method for establishing a bearer, where the method includes:

after a core network node initiates a bearer setup request, receiving, by a gateway node, a first identifier and a third identifier that are sent by a macro access network node, where the first identifier is used to enable the core network node to identify uplink user data forwarded by the gateway node, the first identifier is sent by the core network node to the macro access network node, the third identifier is used to enable a first small access network node to identify downlink user data forwarded by the gateway node, and the third identifier is sent by the first small access network node to the macro access network node; and sending, by the gateway node, a second identifier and a fourth identifier to the macro access network node, so that the macro access network node sends the second identifier to the first small access network node and sends the fourth identifier to the core network node, where the second identifier is used to enable the gateway node to identify uplink user data sent by the first small access network node, the fourth identifier is used to enable the gateway node to identify downlink user data sent by the core network node, and the second identifier and the fourth identifier are allocated by the gateway node.

With reference to the first aspect, in a first possible implementation manner of the first aspect, the receiving a first identifier and a third identifier that are sent by a macro access network node includes:

receiving a bearer establishment request message sent by the macro access network node, where the bearer establishment request message carries the first identifier; and receiving a first bearer modification request message sent by the macro access network node, where the first bearer modification request message carries the third identifier.

With reference to the first possible implementation manner of the first aspect, in a second possible implementation manner, the sending a second identifier and a fourth identifier to the macro access network node includes:

after the receiving a bearer establishment request message sent by the macro access network node, returning a bearer establishment response message to the macro access network node, where the bearer establishment response message carries the second identifier; and after the receiving a first bearer modification request message sent by the macro access network node, returning a first bearer modification response message to the macro access network node, where the first bearer modification response message carries the fourth identifier.

In the method of a third possible implementation of the first aspect, after the receiving, by a gateway node, a first identifier and a third identifier that are sent by a macro access network node, the method further includes:

after the macro access network node initiates a bearer addition request to a second small access network node, receiving, by the gateway node, a second bearer modification request message sent by the macro access network node, where the second bearer modification request message carries a fifth identifier, where the fifth identifier is used to enable the second small access network node to identify downlink user data forwarded by the gateway node; and returning, by the gateway node, a second bearer modification response message to the macro access network node, so that the macro access network node sends a bearer deletion request message to the first small access network node.

With reference to the method of the third possible implementation of the first aspect, in the method of a fourth possible implementation, the second bearer modification request message further includes a sixth identifier, where the sixth identifier is used to enable the second small access network node to identify data that is forwarded by the gateway node but is not successfully sent by the first small access network node; and the second bearer modification response message further includes a seventh identifier, where the seventh identifier is used to enable the gateway node to identify data that is sent by the first small access network node but is not successfully sent.

According to a second aspect, an embodiment of the present invention provides a method for establishing a bearer, where the method includes:

after a core network node initiates a bearer setup request, sending, by a macro access network node, a first identifier and a third identifier to a gateway node, where the first identifier is used to enable the core network node to identify uplink user data forwarded by the gateway node, the first identifier is sent by the core network node to the macro access network node, the third identifier is used to enable a first small access network node to identify downlink user data forwarded by the gateway node, and the third identifier is sent by the first small access network node to the macro access network node;

receiving, by the macro access network node, a second identifier and a fourth identifier that are sent by the gateway node, where the second identifier is used to enable the gateway node to identify uplink user data sent by the first small access network node, the fourth identifier is used to enable the gateway node to identify downlink user data sent by the core network node, and the second identifier and the fourth identifier are allocated by the gateway node;

forwarding, by the macro access network node, the second identifier to the first small access network node; and forwarding, by the macro access network node, the fourth identifier to the core network node.

With reference to the second aspect, in a first possible implementation manner of the second aspect, before the sending, by a macro access network node, a first identifier and a third identifier to a gateway node, the method further includes:

receiving, by the macro access network node, a bearer setup request message sent by the core network node, where the bearer setup request message carries the first identifier.

With reference to the method of a possible implementation of the second aspect, in the method of a second possible implementation, the sending a first identifier and a third identifier to a gateway node includes:

sending a bearer establishment request message to the gateway node, where the bearer establishment request message carries the first identifier; and sending a first bearer modification request message to the gateway node, where the first bearer modification request message carries the third identifier.

With reference to the method of the second possible implementation of the second aspect, in the method of a third possible implementation, the receiving a second identifier and a fourth identifier that are sent by the gateway node includes:

after the sending a bearer establishment request message to the gateway node, receiving a bearer establishment response message returned by the gateway node, where the bearer establishment response message carries the second identifier; and after the sending a first bearer modification request message to the gateway node, receiving a first bearer modification response message returned by the gateway node, where the first bearer modification response message carries the fourth identifier.

With reference to the method of the first possible implementation of the second aspect, in the method of a fourth possible implementation, forwarding, by the macro access network node, the second identifier to the first small access network node includes:

sending a first bearer addition request message to the first small access network node, where the first bearer addition request message carries the second identifier; and forwarding, by the macro access network node, the fourth identifier to the core network node includes:

sending a bearer setup response message to the core network node, where the bearer setup response message carries the fourth identifier.

With reference to the method of a possible implementation of the second aspect, in the method of a fifth possible implementation, after the sending, by a macro access network node, a first identifier and a third identifier to a gateway node, the method further includes:

sending, by the macro access network node, a second bearer addition request message to a second small access network node, where the second bearer addition request message carries the second identifier;

receiving, by the macro access network node, a second bearer addition response message returned by the second small access network node, where the second bearer addition response message carries a fifth identifier, where the fifth identifier is used to enable the second small access network node to identify downlink user data forwarded by the gateway node;

sending, by the macro access network node, a second bearer modification request message to the gateway node, where the second bearer modification request message carries the fifth identifier;

receiving, by the macro access network node, a second bearer modification response message returned by the gateway node; and sending, by the macro access network node, a bearer deletion request message to the first small access network node.

With reference to the method of the fifth possible implementation of the second aspect, in the method of a sixth possible implementation, the second bearer addition response message further includes a sixth identifier, where the sixth identifier is used to enable the second small access network node to identify data that is forwarded by the gateway node but is not successfully sent by the first small access network node;

the second bearer modification request message further includes the sixth identifier;

the second bearer modification response message further includes a seventh identifier, where the seventh identifier is used to enable the gateway node to identify data that is sent by the first small access network node but is not successfully sent; and the bearer deletion request message further includes the seventh identifier.

According to a third aspect, an embodiment of the present invention provides a method for establishing a bearer, where the method includes:

after a core network node initiates a bearer setup request, receiving, by a macro access network node, a first identifier sent by the core network node and a third identifier sent by a first small access network node, where the first identifier is used to enable the core network node to identify uplink user data forwarded by a gateway node, and the third identifier is used to enable the first small access network node to identify downlink user data forwarded by the gateway node;

sending, by the macro access network node, the first identifier, a second identifier, the third identifier, and a fourth identifier to the gateway node, where the second identifier is used to enable the gateway node to identify uplink user data sent by the first small access network node, the fourth identifier is used to enable the gateway node to identify downlink user data sent by the core network node, and the second identifier and the fourth identifier are allocated by the macro access network node;

sending, by the macro access network node, the second identifier to the first small access network node; and sending, by the macro access network node, the fourth identifier to the core network node.

With reference to the method of a possible implementation of the third aspect, in the method of a first possible implementation, the receiving a first identifier sent by the core network node and a third identifier sent by a first small access network node includes:

receiving a bearer setup request message sent by the core network node, where the bearer setup request message carries the first identifier;

sending a first bearer addition request message to the first small access network node; and receiving a first bearer addition response message returned by the first small access network node, where the first bearer addition response message carries the third identifier.

With reference to the method of the first possible implementation of the third aspect, in the method of a second possible implementation, the sending the first identifier, a second identifier, the third identifier, and a fourth identifier to the gateway node includes:

after the receiving a first bearer addition response message returned by the first small access network node, sending a bearer establishment request message to the gateway node, where the bearer establishment request message carries the first identifier, the second identifier, the third identifier, and the fourth identifier.

With reference to the method of a possible implementation of the third aspect, in the method of a third possible implementation, sending, by the macro access network node, the fourth identifier to the core network node includes:

after receiving a bearer setup request message sent by the core network node, sending a bearer setup response message to the core network node, where the bearer setup response message carries the fourth identifier.

With reference to the method of a possible implementation of the third aspect, in the method of a fourth possible implementation, sending, by the macro access network node, the second identifier to the first small access network node includes:

after receiving a bearer setup request message sent by the core network node, sending a first bearer addition request message to the first small access network node, where the first bearer addition request message carries the second identifier.

With reference to the method of a possible implementation of the third aspect, in the method of a fifth possible implementation, after the sending, by the macro access network node, the first identifier, a second identifier, the third identifier, and a fourth identifier to the gateway node, the method further includes:

sending, by the macro access network node, a second bearer addition request message to a second small access network node, where the second bearer addition request message carries the second identifier;

receiving, by the macro access network node, a second bearer addition response message returned by the second small access network node, where the second bearer addition response message carries a fifth identifier, where the fifth identifier is used to enable the second small access network node to identify downlink user data forwarded by the gateway node;

sending, by the macro access network node, a bearer modification request message to the gateway node, where the bearer modification request message carries the fifth identifier;

receiving, by the macro access network node, a bearer modification response message returned by the gateway node; and sending, by the macro access network node, a bearer deletion request message to the first small access network node.

With reference to the method of the fifth possible implementation of the third aspect, in the method of a sixth possible implementation, the second bearer addition response message further includes a sixth identifier, where the sixth identifier is used to enable the second small access network node to identify data that is forwarded by the gateway node but is not successfully sent by the first small access network node;

the bearer modification request message further includes the sixth identifier and a seventh identifier, where the seventh identifier is used to enable the gateway node to identify data that is sent by the first small access network node but is not successfully sent; and the bearer deletion request message further includes the seventh identifier.

According to a fourth aspect, an embodiment of the present invention provides a method for establishing a bearer, where the method includes:

after a core network node initiates a bearer setup request, receiving, by a gateway node, a first identifier, a second identifier, a third identifier, and a fourth identifier that are sent by a macro access network node, where the first identifier is used to enable the core network node to identify uplink user data forwarded by the gateway node, the first identifier is sent by the core network node to the macro access network node, the second identifier is used to enable the gateway node to identify uplink user data sent by a first small access network node, the second identifier is allocated by the macro access network node, the third identifier is used to enable the first small access network node to identify downlink user data forwarded by the gateway node, the third identifier is sent by the first small access network node to the macro access network node, the fourth identifier is used to enable the gateway node to identify downlink user data sent by the core network node, and the fourth identifier is allocated by the macro access network node.

In the method of a first possible implementation of the fourth aspect, the receiving a first identifier, a second identifier, a third identifier, and a fourth identifier that are sent by a macro access network node includes:

receiving a bearer establishment request message sent by the macro access network node, where the bearer establishment request message carries the first identifier, the second identifier, the third identifier, and the fourth identifier; and returning a bearer establishment response message to the macro access network node.

In the method of a second possible implementation of the fourth aspect, after the receiving, by a gateway node, a first identifier, a second identifier, a third identifier, and a fourth identifier that are sent by a macro access network node, the method further includes:

after the macro access network node initiates a bearer addition request to a second small access network node, receiving, by the gateway node, a bearer modification request message sent by the macro access network node, where the bearer modification request message carries a fifth identifier, where the fifth identifier is used to enable the second small access network node to identify downlink user data forwarded by the gateway node; and returning, by the gateway node, a bearer modification response message to the macro access network node, so that the macro access network node sends a bearer deletion request message to the first small access network node.

With reference to the method of the second possible implementation of the fourth aspect, in the method of a third possible implementation, the bearer modification request message further includes a sixth identifier and a seventh identifier, where the sixth identifier is used to enable the second small access network node to identify data that is forwarded by the gateway node but is not successfully sent by the first small access network node, and the seventh identifier is used to enable the gateway node to identify data that is sent by the first small access network node but is not successfully sent; and the bearer deletion request message further includes the seventh identifier.

According to a fifth aspect, an embodiment of the present invention provides a gateway node, including:

a first sending unit, configured to: after a core network node initiates a bearer setup request, receive a first identifier and a third identifier that are sent by a macro access network node, where the first identifier is used to enable the core network node to identify uplink user data forwarded by the gateway node, the first identifier is sent by the core network node to the macro access network node, the third identifier is used to enable a first small access network node to identify downlink user data forwarded by the gateway node, and the third identifier is sent by the first small access network node to the macro access network node; and a first receiving unit, configured to send a second identifier and a fourth identifier to the macro access network node, so that the macro access network node sends the second identifier to the first small access network node and sends the fourth identifier to the core network node, where the second identifier is used to enable the gateway node to identify uplink user data sent by the first small access network node, the fourth identifier is used to enable the gateway node to identify downlink user data sent by the core network node, and the second identifier and the fourth identifier are allocated by the gateway node.

In the gateway node of a first possible implementation of the fifth aspect, the first receiving unit includes:

a first receiving module, configured to receive a bearer establishment request message sent by the macro access network node, where the bearer establishment request message carries the first identifier; and a second receiving module, configured to receive a first bearer modification request message sent by the macro access network node, where the first bearer modification request message carries the third identifier;

the first sending unit includes:

a first sending module, configured to: after the bearer establishment request message sent by the macro access network node is received, return a bearer establishment response message to the macro access network node, where the bearer establishment response message carries the second identifier; and a second sending module, configured to: after the first bearer modification request message sent by the macro access network node is received, return a first bearer modification response message to the macro access network node, where the first bearer modification response message carries the fourth identifier.

In the method of a second possible implementation of the fifth aspect, the gateway node further includes:

a second receiving unit, configured to: after the macro access network node initiates a bearer addition request to a second small access network node, receive a second bearer modification request message sent by the macro access network node, where the second bearer modification request message carries a fifth identifier, where the fifth identifier is used to enable the second small access network node to identify downlink user data forwarded by the gateway node; and a second sending unit, configured to return a second bearer modification response message to the macro access network node, so that the macro access network node sends a bearer deletion request message to the first small access network node.

According to a sixth aspect, an embodiment of the present invention provides a macro access network node, including:

an identifier sending unit, configured to: after a core network node initiates a bearer setup request, send a first identifier and a third identifier to a gateway node, where the first identifier is used to enable the core network node to identify uplink user data forwarded by the gateway node, the first identifier is sent by the core network node to the macro access network node, the third identifier is used to enable a first small access network node to identify downlink user data forwarded by the gateway node, and the third identifier is sent by the first small access network node to the macro access network node;

an identifier receiving unit, configured to receive a second identifier and a fourth identifier that are sent by the gateway node, where the second identifier is used to enable the gateway node to identify uplink user data sent by the first small access network node, the fourth identifier is used to enable the gateway node to identify downlink user data sent by the core network node, and the second identifier and the fourth identifier are allocated by the gateway node;

a first forwarding unit, configured to forward the second identifier to the first small access network node; and a second forwarding unit, configured to forward the fourth identifier to the core network node.

In the macro access network node of a first possible implementation of the sixth aspect, the identifier sending unit includes:

a first identifier sending module, configured to send a bearer establishment request message to the gateway node, where the bearer establishment request message carries the first identifier; and a second identifier sending module, configured to send a first bearer modification request message to the gateway node, where the first bearer modification request message carries the third identifier;

the identifier receiving unit includes:

a first identifier receiving module, configured to: after the bearer establishment request message is sent to the gateway node, receive a bearer establishment response message returned by the gateway node, where the bearer establishment response message carries the second identifier; and a second identifier receiving module, configured to: after the first bearer modification request message is sent to the gateway node, receive a first bearer modification response message returned by the gateway node, where the first bearer modification response message carries the fourth identifier.

In the method of a second possible implementation of the sixth aspect, the first forwarding unit is specifically configured to send a first bearer addition request message to the first small access network node, where the first bearer addition request message carries the second identifier; and the second forwarding unit is specifically configured to send a bearer setup response message to the core network node, where the bearer setup response message carries the fourth identifier.

In the method of a third possible implementation of the sixth aspect, the macro access network node further includes:

an addition requesting unit, configured to send a second bearer addition request message to a second small access network node, where the second bearer addition request message carries the second identifier;

an addition responding unit, configured to receive a second bearer addition response message returned by the second small access network node, where the second bearer addition response message carries a fifth identifier, where the fifth identifier is used to enable the second small access network node to identify downlink user data forwarded by the gateway node;

a modification requesting unit, configured to send a second bearer modification request message to the gateway node, where the second bearer modification request message carries the fifth identifier;

a modification responding unit, configured to receive a second bearer modification response message returned by the gateway node; and a deletion requesting unit, configured to send a bearer deletion request message to the first small access network node.

According to a seventh aspect, an embodiment of the present invention provides a macro access network node, including:

a receiving unit, configured to: after a core network node initiates a bearer setup request, receive a first identifier sent by the core network node and a third identifier sent by a first small access network node, where the first identifier is used to enable the core network node to identify uplink user data forwarded by a gateway node, and the third identifier is used to enable the first small access network node to identify downlink user data forwarded by the gateway node;

a gateway sending unit, configured to send the first identifier, a second identifier, the third identifier, and a fourth identifier to the gateway node, where the second identifier is used to enable the gateway node to identify uplink user data sent by the first small access network node, the fourth identifier is used to enable the gateway node to identify downlink user data sent by the core network node, and the second identifier and the fourth identifier are allocated by the macro access network node;

a small access network sending unit, configured to send the second identifier to the first small access network node; and a core network sending unit, configured to send the fourth identifier to the core network node.

In the macro access network node of a first possible implementation of the seventh aspect, the receiving unit includes:

a first receiving module, configured to receive a bearer setup request message sent by the core network node, where the bearer setup request message carries the first identifier; and a second receiving module, configured to receive a first bearer addition response message returned by the first small access network node, where the first bearer addition response message carries the third identifier.

With reference to the method of the first possible implementation of the seventh aspect, in the method of a second possible implementation, the gateway sending unit is specifically configured to:

after the first bearer addition response message returned by the first small access network node is received, send a bearer establishment request message to the gateway node, where the bearer establishment request message carries the first identifier, the second identifier, the third identifier, and the fourth identifier.

In the method of a third possible implementation of the seventh aspect, the core network receiving unit is specifically configured to:

after a bearer setup request message sent by the core network node is received, send a bearer setup response message to the core network node, where the bearer setup response message carries the fourth identifier; and the small access network sending unit is specifically configured to:

after a bearer setup request message sent by the core network node is received, send a first bearer addition request message to the first small access network node, where the first bearer addition request message carries the second identifier.

In the method of a fourth possible implementation of the seventh aspect, the macro access network node further includes:

a bearer switching unit, configured to: send a second bearer addition request message to a second small access network node, where the second bearer addition request message carries the second identifier; receive a second bearer addition response message returned by the second small access network node, where the second bearer addition response message carries a fifth identifier, where the fifth identifier is used to enable the second small access network node to identify downlink user data forwarded by the gateway node; send a bearer modification request message to the gateway node, where the bearer modification request message carries the fifth identifier; receive a bearer modification response message returned by the gateway node; and send a bearer deletion request message to the first small access network node.

According to an eighth aspect, an embodiment of the present invention provides a gateway node, including:

a request receiving unit, configured to: after a core network node initiates a bearer setup request, receive a bearer establishment request message sent by a macro access network node, where the bearer establishment request message carries a first identifier, a second identifier, a third identifier, and a fourth identifier, where the first identifier is used to enable the core network node to identify uplink user data forwarded by the gateway node, the first identifier is sent by the core network node to the macro access network node, the second identifier is used to enable the gateway node to identify uplink user data sent by a first small access network node, the second identifier is allocated by the macro access network node, the third identifier is used to enable the first small access network node to identify downlink user data forwarded by the gateway node, the third identifier is sent by the first small access network node to the macro access network node, the fourth identifier is used to enable the gateway node to identify downlink user data sent by the core network node, and the fourth identifier is allocated by the macro access network node; and a request responding unit, configured to return a bearer establishment response message to the macro access network node.

With reference to the gateway node of a possible implementation of the eighth aspect, in the method of a first possible implementation, the gateway node further includes:

a small access network switching unit, configured to: after the macro access network node initiates a bearer addition request to a second small access network node, receive a bearer modification request message sent by the macro access network node, where the bearer modification request message carries a fifth identifier, where the fifth identifier is used to enable the second small access network node to identify downlink user data forwarded by the gateway node; and return a second bearer modification response message to the macro access network node, so that the macro access network node sends a bearer deletion request message to the first small access network node.

According to a ninth aspect, an embodiment of the present invention provides a gateway node, including:

an input apparatus, an output apparatus, a memory, and a processor; where:

the input apparatus executes the following step:

after a core network node initiates a bearer setup request, receiving a first identifier and a third identifier that are sent by a macro access network node;

the output apparatus executes the following step:

sending a second identifier and a fourth identifier to the macro access network node;

the memory stores the following content:

the first identifier, used to enable the core network node to identify uplink user data forwarded by the gateway node; the third identifier, used to enable a small access network node to identify downlink user data forwarded by the gateway node; the second identifier, used to enable the gateway node to identify uplink user data sent by the small access network node; and the fourth identifier, used to enable the gateway node to identify downlink user data sent by the core network node, where the first identifier is sent by the core network node to the macro access network node, the third identifier is sent by the first small access network node to the macro access network node, and the second identifier and the fourth identifier are allocated by the gateway node;

the processor executes the following steps:

using the first identifier to send uplink user data to the core network node, and using the third identifier to send downlink user data to the small access network node;

using the fourth identifier to identify uplink user data sent by the core network node, and using the second identifier to identify downlink user data sent by the small access network node; and allocating the second identifier to the small access network node, and allocating the fourth identifier to the core network node.

According to a tenth aspect, an embodiment of the present invention provides a macro access network node, including:

an input apparatus, an output apparatus, a memory, and a processor; wherein:

the input apparatus executes the following step:

receiving a second identifier and a fourth identifier that are sent by a gateway node;

the output apparatus executes the following steps:

sending a first identifier and a third identifier to the gateway node;

forwarding the second identifier to a small access network node; and forwarding the fourth identifier to a core network node;

the memory stores the following content:

the first identifier, used to enable the core network node to identify uplink user data forwarded by the gateway node; the third identifier, used to enable the small access network node to identify downlink user data forwarded by the gateway node; the second identifier, used to enable the gateway node to identify uplink user data sent by the small access network node; and the fourth identifier, used to enable the gateway node to identify downlink user data sent by the core network node, where the first identifier is sent by the core network node to the macro access network node, the third identifier is sent by the first small access network node to the macro access network node, and the second identifier and the fourth identifier are allocated by the gateway node.

According to an eleventh aspect, an embodiment of the present invention provides a macro access network node, including:

an input apparatus, an output apparatus, a memory, and a processor; where:

the input apparatus executes the following step:

receiving a first identifier sent by a core network node and a third identifier sent by a small access network node;

the output apparatus executes the following steps:

sending the first identifier, a second identifier, the third identifier, and a fourth identifier to a gateway node;

sending the second identifier to the small access network node; and sending the fourth identifier to the core network node;

the memory stores the following content:

the first identifier, used to enable the core network node to identify uplink user data forwarded by the gateway node; the third identifier, used to enable the small access network node to identify downlink user data forwarded by the gateway node; the second identifier, used to enable the gateway node to identify uplink user data sent by the small access network node; and the fourth identifier, used to enable the gateway node to identify downlink user data sent by the core network node, where the second identifier and the fourth identifier are allocated by the macro access network node;

the processor executes the following step:

allocating the second identifier to the small access network node and the gateway node, and allocating the fourth identifier to the core network node and the gateway node.

According to a twelfth aspect, an embodiment of the present invention provides a gateway node, including:

an input apparatus, an output apparatus, a memory, and a processor; where:

the input apparatus executes the following step:

after a core network node initiates a bearer setup request, receiving, by the gateway node, a first identifier, a second identifier, a third identifier, and a fourth identifier that are sent by a macro access network node;

the memory stores the following content:

the first identifier, used to enable the core network node to identify uplink user data forwarded by the gateway node; the third identifier, used to enable a small access network node to identify downlink user data forwarded by the gateway node; the second identifier, used to enable the gateway node to identify uplink user data sent by the small access network node; and the fourth identifier, used to enable the gateway node to identify downlink user data sent by the core network node, where the second identifier and the fourth identifier are allocated by the macro access network node;

the processor executes the following steps:

using the first identifier to send uplink user data to the core network node, and using the third identifier to send downlink user data to the small access network node; and using the fourth identifier to identify uplink user data sent by the core network node, and using the second identifier to identify downlink user data sent by the small access network node.

According to a thirteenth aspect, an embodiment of the present invention provides a system for establishing a bearer, where the system includes a small access network node, a macro access network node, a gateway node, and a core network node, where:

the macro access network node is configured to: after the core network node initiates a bearer setup request, send a first identifier and a third identifier to the gateway node, where the first identifier is used to enable the core network node to identify uplink user data forwarded by the gateway node, and the third identifier is used to enable the small access network node to identify downlink user data forwarded by the gateway node; receive a second identifier and a fourth identifier that are sent by the gateway node, where the second identifier is used to enable the gateway node to identify uplink user data sent by the small access network node, and the fourth identifier is used to enable the gateway node to identify downlink user data sent by the core network node; forward the second identifier to the small access network node; and forward the fourth identifier to the core network node; where the first identifier is sent by the core network node to the macro access network node, the third identifier is sent by the first small access network node to the macro access network node, and the second identifier and the fourth identifier are allocated by the gateway node; and the gateway node is configured to receive the first identifier and the third identifier that are sent by the macro access network node, and send the second identifier and the fourth identifier to the macro access network node, so that the macro access network node sends the second identifier to the small access network node and sends the fourth identifier to the core network node.

According to a fourteenth aspect, an embodiment of the present invention provides a system for establishing a bearer, where the system includes a small access network node, a macro access network node, a gateway node, and a core network node, where:

the macro access network node is configured to: after the core network node initiates a bearer setup request, receive a first identifier sent by the core network node and a third identifier sent by the small access network node, where the first identifier is used to enable the core network node to identify uplink user data forwarded by the gateway node, and the third identifier is used to enable the small access network node to identify downlink user data forwarded by the gateway node; send the first identifier, a second identifier, the third identifier, and a fourth identifier to the gateway node, where the second identifier is used to enable the gateway node to identify uplink user data sent by the small access network node, and the fourth identifier is used to enable the gateway node to identify downlink user data sent by the core network node; send the second identifier to the small access network node; and send the fourth identifier to the core network node; where the second identifier and the fourth identifier are allocated by the macro access network node; and the gateway node is configured to receive the first identifier, the second identifier, the third identifier, and the fourth identifier that are sent by the macro access network node.

As can be seen from the foregoing technical solutions, the embodiments of the present invention have the following advantages:

In the embodiments of the present invention, a gateway node is introduced to forward user data between a core network node and a small access network node. During a bearer establishment process, the gateway node obtains a first identifier and a third identifier through a macro access network node, so that the core network node may identify uplink user data sent by the gateway node by using the first identifier, and the small access network node may identify downlink user data sent by the gateway node by using the third identifier. In addition, the gateway node also respectively sends a second identifier and a fourth identifier to the small access network node and the core network node through the macro access network node, so that the gateway node may also identify uplink user data sent by the small access network node by using the second identifier and downlink user data sent by the core network node by using the fourth identifier. Therefore, during a user data transmission process, forwarding processing by the macro access network node is not required, and an overhead of processing user data by the macro access network node is reduced.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
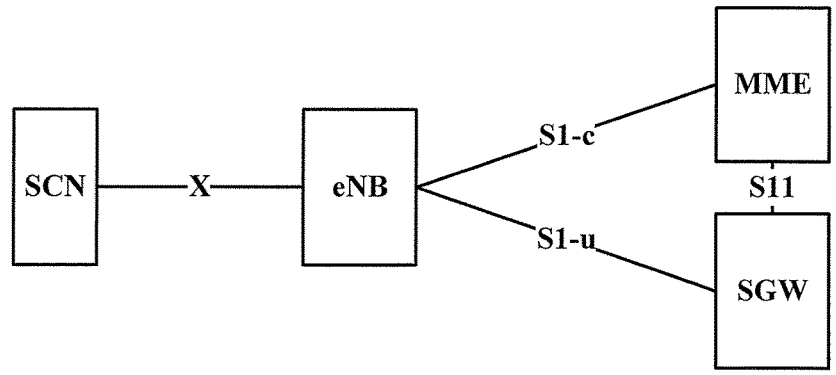
FIG. 1 is a schematic diagram of a network architecture in the prior art.
Figure 2:
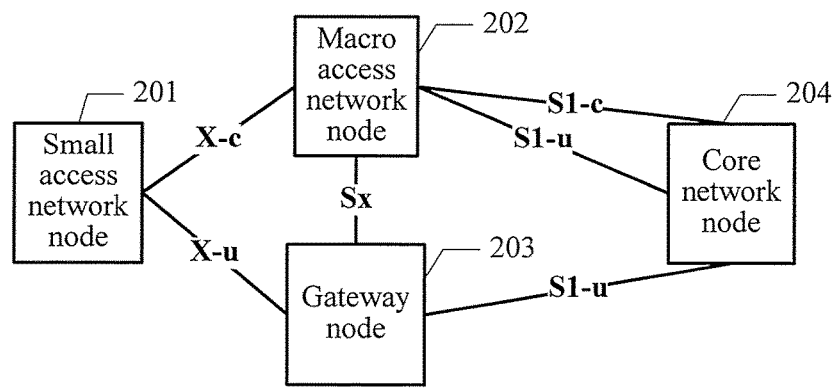
FIG. 2 is a schematic diagram of a network architecture of a method for establishing a bearer according to the present invention.

In an embodiment of the present invention, on a basis of an existing network architecture, a gateway node 203 is introduced. FIG. 2 shows a specific network architecture. Under the control of a macro access network node 202, the gateway node 203 is configured to forward uplink user data and downlink user data between a small access network node 201 and a core network node 204. Exemplarily, the gateway node 203 may be connected to the core network node 204 through an S1 user plane interface S1-u, and the gateway node 203 may be connected to the macro access network node 202 through an Sx interface. The macro access network node 202 is connected to the core network node 204 through a control plane interface S1-c. The X interface may be divided into two parts: a control plane interface X-c and a user plane interface X-u. The small access network node 201 is connected to the macro access network node 202 through the X-c interface, and the small access network node 201 is connected to the gateway node 203 through the X-u interface. The control plane interfaces (for example, X-c and S1-c) are configured to transmit control signaling or control messages. The user plane interfaces (for example, X-u and S1-u) are configured to transmit user data.

Figure 3:
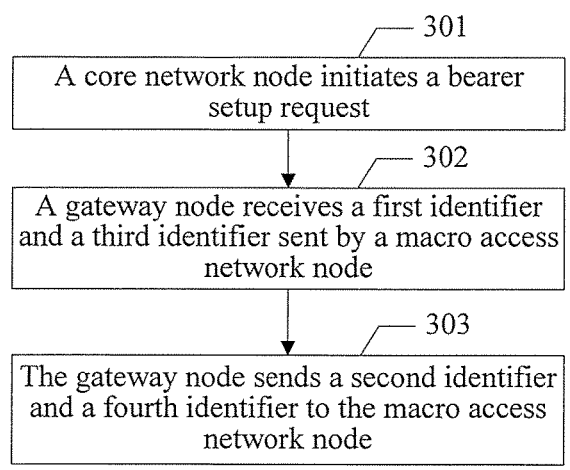
FIG. 3 is a schematic flowchart of a method for establishing a bearer according to the present invention.

Referring to FIG. 3, a method for establishing a bearer in an embodiment of the present invention includes:

301. A core network node initiates a bearer setup request.

The core network node initiates the bearer setup request to a macro access network node, so that the macro access network node enters a bearer setup procedure.

Optionally, the core network node may be a serving general packet radio service support node (SGSN), or a network system including a mobility management entity (MME) and a serving gateway (SGW).

Optionally, the macro access network node may be an eNB, a home eNodeB gateway (HeNB GW) in a long term evolution system, or a home NodeB gateway (HNB GW), a NodeB (NB, NodeB), a donor eNodeB (DeNB) or the like in a universal mobile telecommunications system.

302. A gateway node receives a first identifier and a third identifier that are sent by the macro access network node.

The gateway node receives the first identifier and the third identifier that are sent by the macro access network node, where the first identifier is used to enable the core network node to identify uplink user data forwarded by the gateway node, and the third identifier is used to enable a small access network node to identify downlink user data forwarded by the gateway node.

Specifically, in this embodiment of the present invention, the first identifier is allocated by the core network node, sent by the core network node to the macro access network node, and then sent by the macro access network node to the gateway node. The third identifier is allocated by the small access network node, and sent by the small access network node to the macro access network node, and then sent by the macro access network node to the gateway node.

Optionally, the small access network node may be an SCN, a relay node (RN), a home NodeB (Home eNB or Home NB), a micro base station (Micro eNB), a pico base station (Pico eNB), a femto base station (Femto eNB), a WiFi access point (Access Point, AP), or the like.

Optionally, the gateway node may be a gateway (Gateway, GW) or a base station.

303. The gateway node sends a second identifier and a fourth identifier to the macro access network node.

The gateway node sends the second identifier and the fourth identifier to the macro access network node, so that the macro access network node sends the second identifier to the small access network node and sends the fourth identifier to the core network node, where the second identifier is used to enable the gateway node to identify uplink user data sent by the small access network node, and the fourth identifier is used to enable the gateway node to identify downlink user data sent by the core network node.

Specifically, in this embodiment of the present invention, the second identifier and the fourth identifier are allocated by the gateway node. After the gateway node obtains the first identifier and the third identifier, the small access network node obtains the second identifier, and the core network node obtains the fourth identifier, user data transmission may be performed between the small access network node and the core network node.

Exemplary, when the small access network node needs to transmit uplink user data to the core network node, the small access network node first sends the uplink user data to the gateway node, where a data packet of the uplink user data carries the second identifier; then the gateway node removes the second identifier carried in the data packet of the uplink user data, and adds the first identifier to the data packet; finally, the gateway node sends to the core network node the data packet of the uplink user data that carries the first identifier.

Likewise, when the core network node needs to transmit downlink user data to the small access network node, the core network node first sends the downlink user data to the gateway node, where a data packet of the downlink user data carries the fourth identifier; then the gateway node removes the fourth identifier carried in the data packet of the downlink user data, and adds the third identifier; finally, the gateway node sends to the small access network node the data packet of the downlink user data that carries the third identifier.

As shown in FIG. 2, no matter uplink user data or downlink user data is transmitted, user data is directly transmitted through a user plane interface in FIG. 2, and processing by the macro access network node is not required. Therefore, a possibility that the macro access network node cannot work properly due to too heavy load caused by too much user data, and a possibility that congestion occurs on a link between the macro access network node and the core network node due to too much user data is also reduced.

In this embodiment of the present invention, a gateway node is introduced to forward user data between a core network node and a small access network node. During a bearer establishment process, the gateway node obtains a first identifier and a third identifier through a macro access network node, so that the core network node may identify uplink user data sent by the gateway node by using the first identifier, and the small access network node may identify downlink user data sent by the gateway node by using the third identifier. In addition, the gateway node also respectively sends a second identifier and a fourth identifier to the small access network node and the core network node through the macro access network node, so that the gateway node may also identify uplink user data sent by the small access network node by using the second identifier and user data sent by the core network node by using the fourth identifier. Therefore, during a user data transmission process, forwarding processing by the macro access network node is not required, and an overhead of processing user data by the macro access network node is reduced.

In addition, in actual deployment of an existing network, an SCN-eNB-SGW connection is not always the shortest, and other shorter connections may also exist between the SCN and the SGW. An existing network architecture requires that data between the SCN and the SGW be forwarded by the eNB. In this case, a transmission delay of user data is increased. In the network architecture in this embodiment of the present invention, because the gateway node is added, shorter connections may be fully used, and the transmission delay of user data is reduced.

Figure 4:
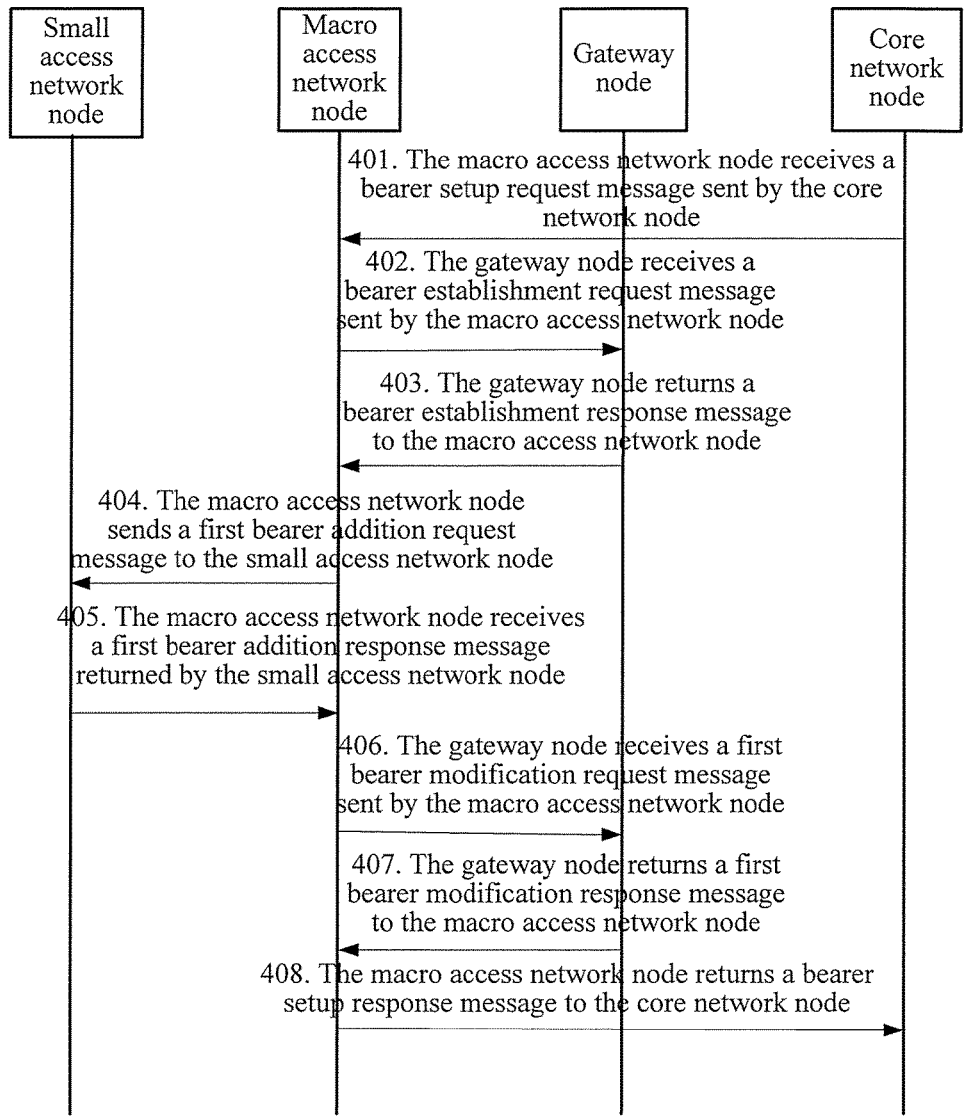
FIG. 4 is a flowchart of signaling in a method for establishing a bearer according to the present invention.

By using specific signaling messages, the following describes in detail a method for establishing a bearer in an embodiment of the present invention. Referring to FIG. 4, another embodiment of a method for establishing a bearer in an embodiment of the present invention includes:

401. A macro access network node receives a bearer setup request message sent by a core network node.

The macro access network node receives the bearer setup request message sent by the core network node, where the bearer setup request message carries a first identifier.

The first identifier is allocated by the core network node, and used to enable the core network node to identify uplink user data forwarded by a gateway node.

402. A gateway node receives a bearer establishment request message sent by the macro access network node.

The gateway node receives the bearer establishment request message sent by the macro access network node, where the bearer establishment request message carries the first identifier.

403. The gateway node returns a bearer establishment response message to the macro access network node.

The gateway node returns the bearer establishment response message to the macro access network node, where the bearer establishment response message carries a second identifier.

The second identifier is allocated by the gateway node, and used to enable the gateway node to identify uplink user data sent by a small access network node.

404. The macro access network node sends a first bearer addition request message to the small access network node.

The macro access network node sends the first bearer addition request message to the small access network node, where the first bearer addition request message carries the second identifier.

405. The macro access network node receives a first bearer addition response message returned by the small access network node.

The macro access network node receives the first bearer addition response message returned by the small access network node, where the first bearer addition response message carries a third identifier.

The third identifier is allocated by the small access network node, and used to enable the small access network node to identify downlink user data forwarded by the gateway node.

406. The gateway node receives a first bearer modification request message sent by the macro access network node.

The gateway node receives the first bearer modification request message sent by the macro access network node, where the first bearer modification request message carries the third identifier.

407. The gateway node returns a first bearer modification response message to the macro access network node.

The gateway node returns the first bearer modification response message to the macro access network node, where the first bearer modification response message carries a fourth identifier.

The fourth identifier is allocated by the gateway node, and used to enable the gateway node to identify downlink user data sent by the core network node.

408. The macro access network node returns a bearer setup response message to the core network node.

This embodiment of the present invention is a bearer establishment process. This process occurs in the network architecture shown in FIG. 2. During this process, a bearer that spans three nodes, that is, the small access network node, the gateway node, and the core network node, is established. Data on the bearer is transmitted through two tunnel segments, where one tunnel segment is established between the small access network node and the gateway node, and the other tunnel segment is established between the gateway node and the core network node. Each tunnel segment has two tunnel endpoint identifiers (Tunnel Endpoint Identifiers, TEIDs), namely, the foregoing first identifier, second identifier, third identifier, and fourth identifier. During the bearer establishment process, nodes at both ends of a tunnel each allocate one TEID, and exchange the TEIDs for use during a subsequent process of receiving and sending user data.

Figure 5:
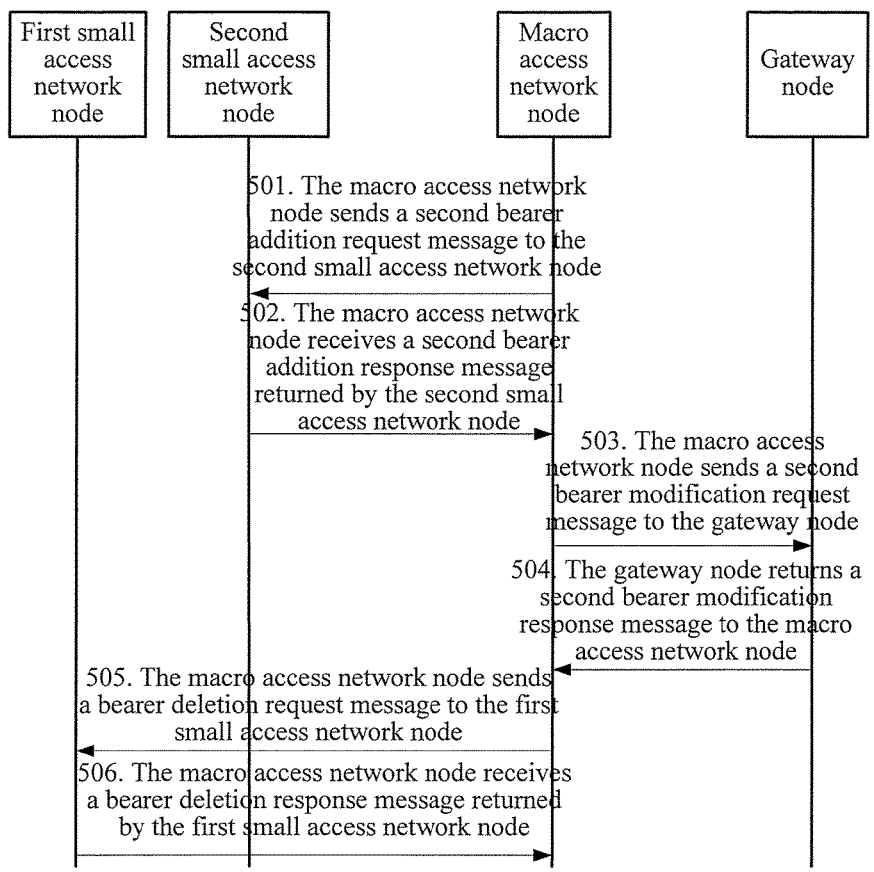
FIG. 5 is another flowchart of signaling in a method for establishing a bearer according to the present invention.

In an actual application, a scenario of mutual switching between small access network nodes may occur. An embodiment of the present invention provides a corresponding solution. Referring to FIG. 5, another embodiment of a method for establishing a bearer in an embodiment of the present invention includes:

501. A macro access network node sends a second bearer addition request message to a second small access network node.

The macro access network node sends the second bearer addition request message to the second small access network node, where the second bearer addition request message carries a second identifier, where the second identifier is allocated by a gateway node, and used to enable the gateway node to identify uplink user data sent by a first small access network node.

This embodiment of the present invention is a process of switching an established bearer from the first small access network node to the second small access network node. This process occurs in the network architecture of the first embodiment. The first small access network node is a source small access network node, and the second small access network node is a target small access network node. Both the first small access network node and the second small access network node are connected to the macro access network node through an X-c interface, and both are connected to the gateway node through an X-u interface. Before the switching, the established bearer spans the first small access network node, the gateway node, and the core network node. After the switching, the established bearer spans the second small access network node—the gateway node—the core network node.

502. The macro access network node receives a second bearer addition response message returned by the second small access network node.

The macro access network node receives the second bearer addition response message returned by the second small access network node, where the second bearer addition response message carries a fifth identifier, where the fifth identifier is used to enable the second small access network node to identify downlink user data forwarded by the gateway node.

Optionally, when the first small access network node has data that is not successfully sent, the second bearer addition response message may further include a sixth identifier, where the sixth identifier is used to enable the second small access network node to identify data that is forwarded by the gateway node but is not successfully sent by the first small access network node. The sixth identifier is allocated by the second small access network node.

503. The macro access network node sends a second bearer modification request message to a gateway node.

The macro access network node sends the second bearer modification request message to the gateway node, where the second bearer modification request message carries the fifth identifier.

Optionally, when the first small access network node has data that is not successfully sent, the second bearer modification request message may further include the sixth identifier.

504. The gateway node returns a second bearer modification response message to the macro access network node.

The gateway node returns the second bearer modification response message to the macro access network node, so that the macro access network node sends a bearer deletion request message to the first small access network node.

Optionally, when the first small access network node has data that is not successfully sent, the second bearer modification response message may further include a seventh identifier, where the seventh identifier is used to enable the gateway node to identify data that is sent by the first small access network node but is not successfully sent.

In this embodiment of the present invention, the seventh identifier is allocated by the gateway node.

505. The macro access network node sends a bearer deletion request message to the first small access network node.

The macro access network node sends the bearer deletion request message to the first small access network node. Optionally, when the first small access network node has data that is not successfully sent, the bearer deletion request message may further carry the seventh identifier.

506. The macro access network node receives a bearer deletion response message returned by the first small access network node.

In this embodiment of the present invention, when the first small access network node has data that is not successfully sent, the first small access network node may send to the second small access network node the data that is not successfully sent, so that the first small access network node first sends to the gateway node the data that is not successfully sent and carries the seventh identifier; then the gateway node removes the seventh identifier in the data that is not successfully sent, and adds the sixth identifier; finally, the gateway node sends to the second small access network node the data that is not successfully sent and carries the sixth identifier, thereby ensuring that important data of a user is not lost.

Figure 6:
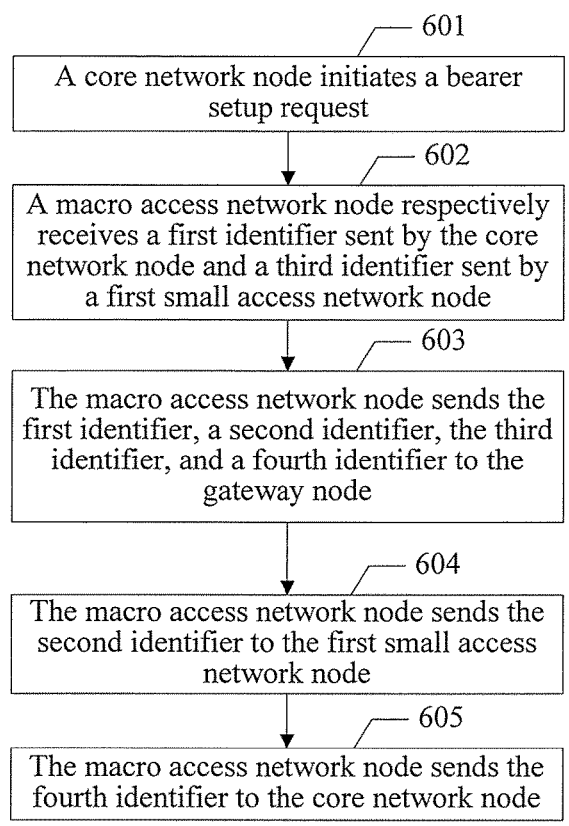
FIG. 6 is another schematic flowchart of a method for establishing a bearer according to the present invention.

In an actual application, a second identifier and a fourth identifier may be allocated by a macro access network node. Specifically, referring to FIG. 6, another embodiment of a method for establishing a bearer in an embodiment of the present invention includes:

601. A core network node initiates a bearer setup request.

The core network node initiates the bearer setup request to a macro access network node, so that the macro access network node enters a bearer setup procedure.

602. The macro access network node receives a first identifier sent by the core network node and a third identifier sent by a first small access network node.

The macro access network node receives the first identifier sent by the core network node and the third identifier sent by the first small access network node, where the first identifier is used to enable the core network node to identify uplink user data forwarded by a gateway node, and the third identifier is used to enable the first small access network node to identify downlink user data forwarded by the gateway node.

In this embodiment of the present invention, the first identifier is allocated by the core network node, and the third identifier is allocated by the first small access network node.

603. The macro access network node sends the first identifier, a second identifier, the third identifier, and a fourth identifier to the gateway node.

The macro access network node sends the first identifier, the second identifier, the third identifier, and the fourth identifier to the gateway node, where the second identifier is used to enable the gateway node to identify uplink user data sent by the first small access network node, and the fourth identifier is used to enable the gateway node to identify downlink user data sent by the core network node.

In this embodiment of the present invention, the second identifier and the fourth identifier are allocated by the macro access network node.

604. The macro access network node sends the second identifier to the first small access network node.

605. The macro access network node sends the fourth identifier to the core network node.

In this embodiment of the present invention, a gateway node is introduced to forward user data between a core network node and a small access network node. During a bearer establishment process, the gateway node obtains a first identifier and a third identifier through a macro access network node, so that the core network node and the small access network node may identify user data sent by the gateway node; the macro access network node sends a second identifier and a fourth identifier to the small access network node and the core network node respectively, so that the gateway node may also identify user data sent by the small access network node and the core network node. Therefore, during a user data transmission process, forwarding processing by the macro access network node is not required, and an overhead of processing user data by the macro access network node is reduced.

Figure 7:
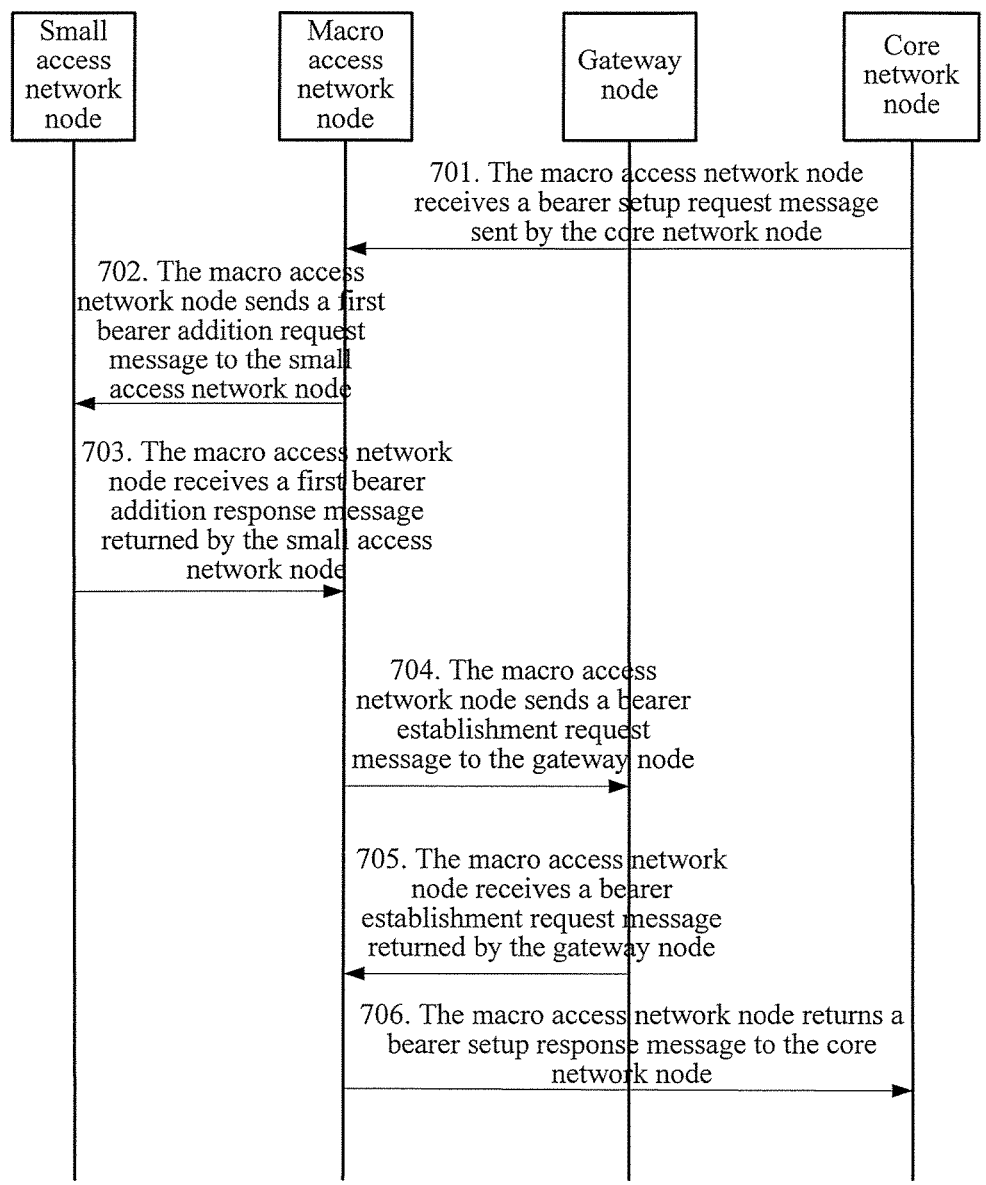
FIG. 7 is another flowchart of signaling in a method for establishing a bearer according to the present invention.

By using specific signaling messages, the following describes in detail a scenario in which a second identifier and a fourth identifier are allocated by a macro access network node in an embodiment of the present invention. Referring to FIG. 7, another embodiment of a method for establishing a bearer in an embodiment of the present invention includes:

701. A macro access network node receives a bearer setup request message sent by a core network node.

The macro access network node receives the bearer setup request message sent by the core network node, where the bearer setup request message carries a first identifier.

The first identifier is allocated by the core network node, and used to enable the core network node to identify uplink user data forwarded by a gateway node.

702. The macro access network node sends a first bearer addition request message to a small access network node.

The macro access network node sends the first bearer addition request message to the small access network node, where the first bearer addition request message carries a second identifier.

In this embodiment of the present invention, the second identifier is allocated by the macro access network node, and used to enable the gateway node to identify uplink user data sent by the small access network node.

703. The macro access network node receives a first bearer addition response message returned by the small access network node.

The macro access network node receives the first bearer addition response message returned by the small access network node, where the first bearer addition response message carries a third identifier.

The third identifier is allocated by the small access network node, and used to enable the small access network node to identify downlink user data forwarded by the gateway node.

704. The macro access network node sends a bearer establishment request message to the gateway node.

The macro access network node sends the bearer establishment request message to the gateway node, where the bearer establishment request message carries the first identifier, the second identifier, the third identifier, and a fourth identifier.

In this embodiment of the present invention, the fourth identifier is allocated by the macro access network node, and used to enable the gateway node to identify downlink user data sent by the core network node.

705. The macro access network node receives a bearer establishment response message returned by the gateway node.

706. The macro access network node returns a bearer setup response message to the core network node.

Figure 8:
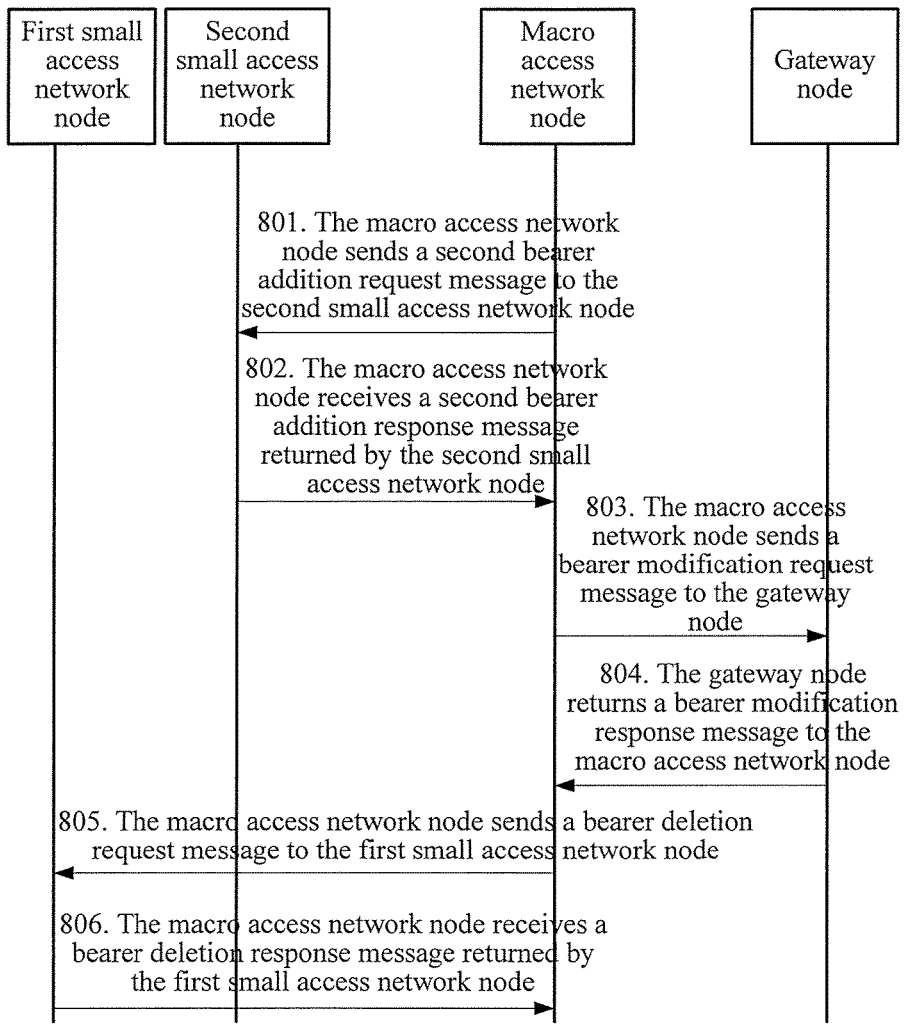
FIG. 8 is another flowchart of signaling in a method for establishing a bearer according to the present invention.

On the premise that a second identifier and a fourth identifier are allocated by a macro access network node, in a scenario of mutual switching between small access network nodes, referring to FIG. 8, another embodiment of a method for establishing a bearer in an embodiment of the present invention includes:

801. A macro access network node sends a second bearer addition request message to a second small access network node.

The macro access network node sends the second bearer addition request message to the second small access network node, where the second bearer addition request message carries a second identifier, where the second identifier is allocated by a gateway node, and used to enable the gateway node to identify uplink user data sent by a first small access network node.

This embodiment of the present invention is a process of switching an established bearer from the first small access network node to the second small access network node. This process occurs in the network architecture of the first embodiment. The first small access network node is a source small access network node, and the second small access network node is a target small access network node. Both the first small access network node and the second small access network node are connected to the macro access network node through an X-c interface, and both are connected to the gateway node through an X-u interface. Before the switching, the established bearer spans the first small access network node-the gateway node-the core network node. After the switching, the established bearer spans the second small access network node-the gateway node-the core network node.

802. The macro access network node receives a second bearer addition response message returned by the second small access network node.

The macro access network node receives the second bearer addition response message returned by the second small access network node, where the second bearer addition response message carries a fifth identifier, where the fifth identifier is used to enable the second small access network node to identify downlink user data forwarded by the gateway node.

Optionally, when the first small access network node has data that is not successfully sent, the second bearer addition response message may further include a sixth identifier, where the sixth identifier is used to enable the second small access network node to identify data that is forwarded by the gateway node but is not successfully sent by the first small access network node. The sixth identifier is allocated by the second small access network node.

803. The macro access network node sends a bearer modification request message to the gateway node.

The macro access network node sends the bearer modification request message to the gateway node, where the bearer modification request message carries the fifth identifier.

Optionally, when the first small access network node has data that is not successfully sent, the bearer modification request message may further include the sixth identifier and a seventh identifier.

In this embodiment of the present invention, the seventh identifier is allocated by the macro access network node, and used to enable the gateway node to identify data that is sent by the first small access network node but is not successfully sent.

804. The gateway node returns a bearer modification response message to the macro access network node.

805. The macro access network node sends a bearer deletion request message to the first small access network node.

The macro access network node sends the bearer deletion request message to the first small access network node. Optionally, when the first small access network node has data that is not successfully sent, the bearer deletion request message may further carry the seventh identifier.

806. The macro access network node receives a bearer deletion response message returned by the first small access network node.

In this embodiment of the present invention, when the first small access network node has data that is not successfully sent, the first small access network node may send to the second small access network node the data that is not successfully sent, so that the first small access network node first sends to the gateway node the data that is not successfully sent and carries the seventh identifier; then the gateway node removes the seventh identifier in the data that is not successfully sent, and adds the sixth identifier; finally, the gateway node sends to the second small access network node the data that is not successfully sent and carries the sixth identifier, thereby ensuring that important data of a user is not lost.

Figure 9:
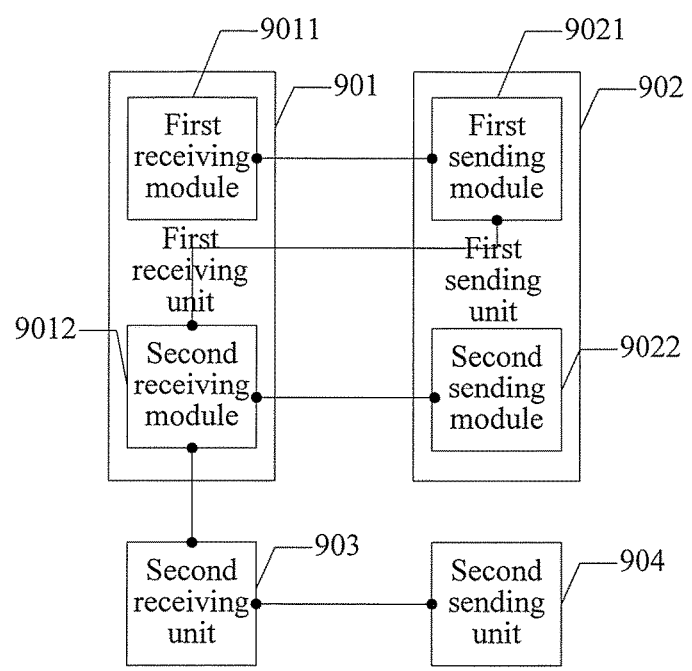
FIG. 9 is a schematic structural diagram of a gateway node according to the present invention.

The following describes an embodiment of a gateway node configured to execute a method for establishing a bearer according to the present invention. For a logical structure of the gateway node, refer to FIG. 9. A gateway node in an embodiment of the present invention includes:

a first sending unit 901, configured to: after a core network node initiates a bearer setup request, receive a first identifier and a third identifier that are sent by a macro access network node, where the first identifier is used to enable the core network node to identify uplink user data forwarded by the gateway node, and the third identifier is used to enable a first small access network node to identify downlink user data forwarded by the gateway node; and a first receiving unit 902, configured to send a second identifier and a fourth identifier to the macro access network node, so that the macro access network node sends the second identifier to the first small access network node and sends the fourth identifier to the core network node, where the second identifier is used to enable the gateway node to identify uplink user data sent by the first small access network node, and the fourth identifier is used to enable the gateway node to identify downlink user data sent by the core network node.

Optionally, the first receiving unit 902 in this embodiment of the present invention may include:

a first receiving module 9021, configured to receive a bearer establishment request message sent by the macro access network node, where the bearer establishment request message carries the first identifier; and a second receiving module 9022, configured to receive a first bearer modification request message sent by the macro access network node, where the first bearer modification request message carries the third identifier.

The first sending unit 901 may include:

a first sending module 9011, configured to: after the bearer establishment request message sent by the macro access network node is received, return a bearer establishment response message to the macro access network node, where the bearer establishment response message carries the second identifier; and a second sending module 9012, configured to: after the first bearer modification request message sent by the macro access network node is received, return a first bearer modification response message to the macro access network node, where the first bearer modification response message carries the fourth identifier.

The gateway node may further include:

a second receiving unit 903, configured to: after the macro access network node initiates a bearer addition request to a second small access network node, receive a second bearer modification request message sent by the macro access network node, where the second bearer modification request message carries a fifth identifier, where the fifth identifier is used to enable the second small access network node to identify downlink user data forwarded by the gateway node; and a second sending unit 904, configured to return a second bearer modification response message to the macro access network node, so that the macro access network node sends a bearer deletion request message to the first small access network node.

For a specific operation process of each of the foregoing units/modules, refer to the method embodiments, and details are not described herein again.

Figure 10:
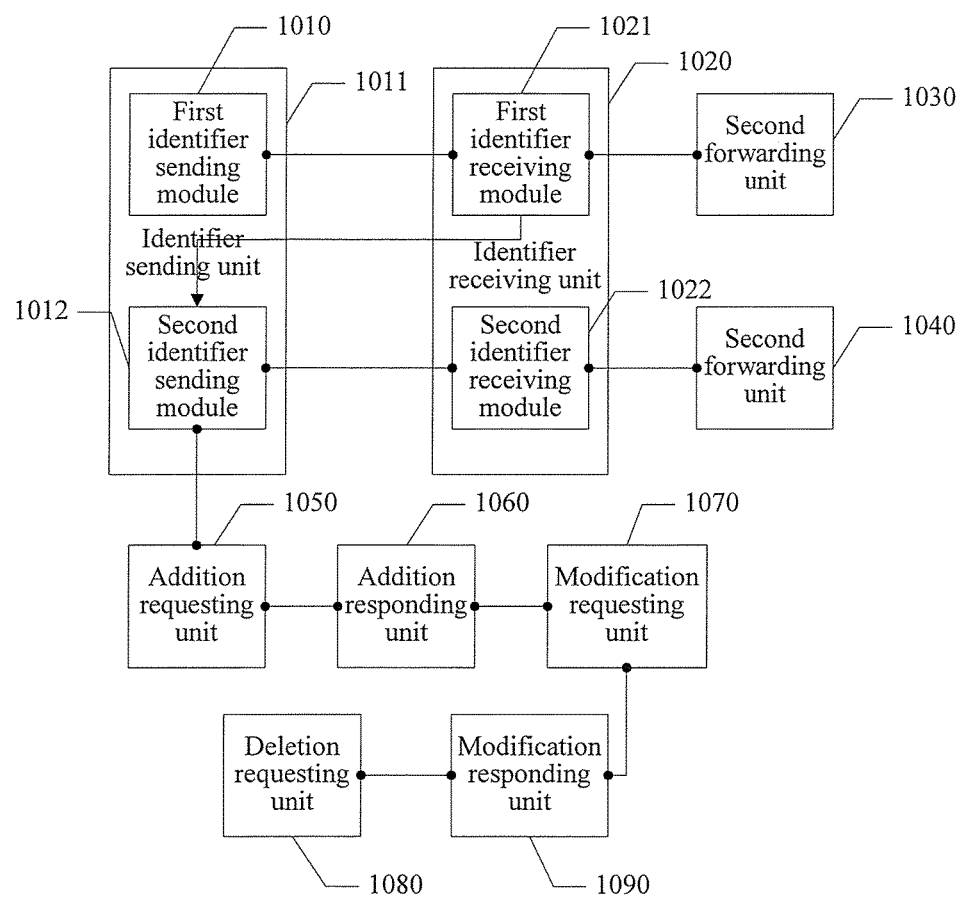
FIG. 10 is a schematic structural diagram of a macro access network node according to the present invention.

The following describes an embodiment of a macro access network node configured to execute a method for establishing a bearer according to the present invention. For a logical structure of the macro access network node, refer to FIG. 10. An embodiment of a macro access network node in an embodiment of the present invention includes:

an identifier sending unit 1010, configured to: after a core network node initiates a bearer setup request, send a first identifier and a third identifier to a gateway node, where the first identifier is used to enable the core network node to identify uplink user data forwarded by the gateway node, and the third identifier is used to enable a first small access network node to identify downlink user data forwarded by the gateway node;

an identifier receiving unit 1020, configured to receive a second identifier and a fourth identifier that are sent by the gateway node, where the second identifier is used to enable the gateway node to identify uplink user data sent by the first small access network node, and the fourth identifier is used to enable the gateway node to identify downlink user data sent by the core network node;

a first forwarding unit 1030, configured to forward the second identifier to the first small access network node; and a second forwarding unit 1040, configured to forward the fourth identifier to the core network node.

Optionally, the identifier sending unit 1010 in this embodiment of the present invention may include:

a first identifier sending module 1011, configured to send a bearer establishment request message to the gateway node, where the bearer establishment request message carries the first identifier; and a second identifier sending module 1012, configured to send a first bearer modification request message to the gateway node, where the first bearer modification request message carries the third identifier.

The identifier receiving unit 1020 may include:

a first identifier receiving module 1021, configured to: after the bearer establishment request message is sent to the gateway node, receive a bearer establishment response message returned by the gateway node, where the bearer establishment response message carries the second identifier; and a second identifier receiving module 1022, configured to: after the first bearer modification request message is sent to the gateway node, receive a first bearer modification response message returned by the gateway node, where the first bearer modification response message carries the fourth identifier.

The first forwarding unit 1030 is specifically configured to send a first bearer addition request message to the first small access network node, where the first bearer addition request message carries the second identifier; and the second forwarding unit 1040 is specifically configured to send a bearer setup response message to the core network node, where the bearer setup response message carries the fourth identifier.

Optionally, the macro access network node may further include:

an addition requesting unit 1050, configured to send a second bearer addition request message to a second small access network node, where the second bearer addition request message carries the second identifier;

an addition responding unit 1060, configured to receive a second bearer addition response message returned by the second small access network node, where the second bearer addition response message carries a fifth identifier, where the fifth identifier is used to enable the second small access network node to identify downlink user data forwarded by the gateway node;

a modification requesting unit 1070, configured to send a second bearer modification request message to the gateway node, where the second bearer modification request message carries the fifth identifier;

a modification responding unit 1080, configured to receive a second bearer modification response message returned by the gateway node; and a deletion requesting unit 1090, configured to send a bearer deletion request message to the first small access network node.

For a specific operation process of each of the foregoing units/modules, refer to the method embodiments, and details are not described herein again.

Figure 11:
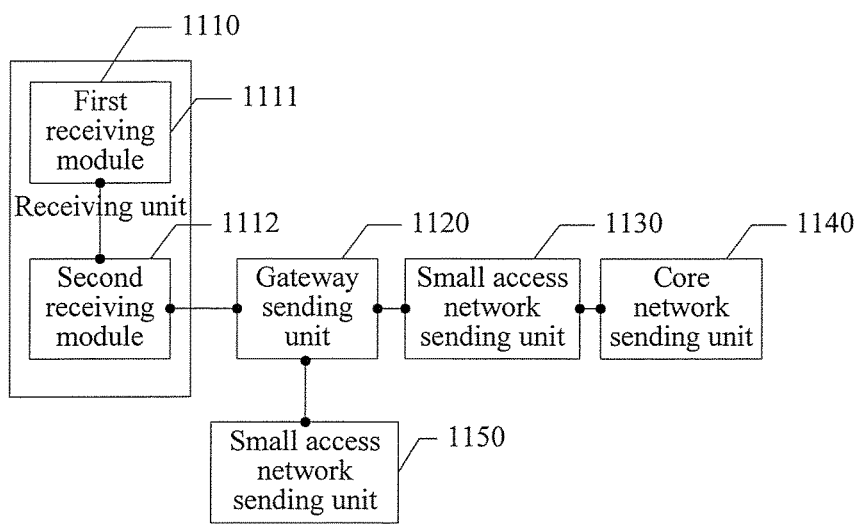
FIG. 11 is another schematic structural diagram of a macro access network node according to the present invention.

The following describes an embodiment of a macro access network node configured to execute a method for establishing a bearer according to the present invention. For a logical structure of the macro access network node, refer to FIG. 11. Another embodiment of a macro access network node in an embodiment of the present invention includes:

a receiving unit 1110, configured to: after a core network node initiates a bearer setup request, receive a first identifier sent by the core network node and a third identifier sent by a first small access network node, where the first identifier is used to enable the core network node to identify uplink user data forwarded by a gateway node, and the third identifier is used to enable the first small access network node to identify downlink user data forwarded by the gateway node;

a gateway sending unit 1120, configured to send the first identifier, a second identifier, the third identifier, and a fourth identifier to the gateway node, where the second identifier is used to enable the gateway node to identify uplink user data sent by the first small access network node, and the fourth identifier is used to enable the gateway node to identify downlink user data sent by the core network node;

a small access network sending unit 1130, configured to send the second identifier to the first small access network node; and a core network sending unit 1140, configured to send the fourth identifier to the core network node.

Optionally, the receiving unit 1110 in this embodiment of the present invention includes:

a first receiving module 1111, configured to receive a bearer setup request message sent by the core network node, where the bearer setup request message carries the first identifier; and a second receiving module 1112, configured to receive a first bearer addition response message returned by the first small access network node, where the first bearer addition response message carries the third identifier.

Optionally, the gateway sending unit 1120 is specifically configured to:

after the first bearer addition response message returned by the first small access network node is received, send a bearer establishment request message to the gateway node, where the bearer establishment request message carries the first identifier, the second identifier, the third identifier, and the fourth identifier.

Optionally, the core network receiving unit 1140 is specifically configured to:

after a bearer setup request message sent by the core network node is received, send a bearer setup response message to the core network node, where the bearer setup response message carries the fourth identifier.

The small access network sending unit 1130 is specifically configured to:

after a bearer setup request message sent by the core network node is received, send a first bearer addition request message to the first small access network node, where the first bearer addition request message carries the second identifier.

Optionally, the macro access network node further includes:

a bearer switching unit 1150, configured to: send a second bearer addition request message to a second small access network node, where the second bearer addition request message carries the second identifier; receive a second bearer addition response message returned by the second small access network node, where the second bearer addition response message carries a fifth identifier, where the fifth identifier is used to enable the second small access network node to identify downlink user data forwarded by the gateway node; send a bearer modification request message to the gateway node, where the bearer modification request message carries the fifth identifier; receive a bearer modification response message returned by the gateway node; and send a bearer deletion request message to the first small access network node.

For a specific operation process of each of the foregoing units/modules, refer to the method embodiments, and details are not described herein again.

Figure 12:
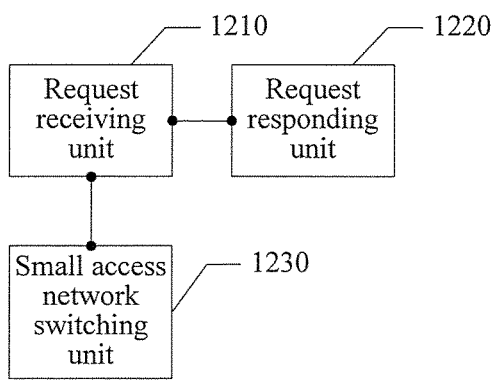
FIG. 12 is another schematic structural diagram of a gateway node according to the present invention.

The following describes an embodiment of a gateway node configured to execute a method for establishing a bearer according to the present invention. For a logical structure of the gateway node, refer to FIG. 12. Another embodiment of a gateway node in an embodiment of the present invention includes:

a request receiving unit 1210, configured to: after a core network node initiates a bearer setup request, receive a bearer establishment request message sent by a macro access network node, where the bearer establishment request message carries a first identifier, a second identifier, a third identifier, and a fourth identifier, where the first identifier is used to enable the core network node to identify uplink user data forwarded by the gateway node, the second identifier is used to enable the gateway node to identify uplink user data sent by a first small access network node, the third identifier is used to enable the first small access network node to identify downlink user data forwarded by the gateway node, and the fourth identifier is used to enable the gateway node to identify downlink user data sent by the core network node; and a request responding unit 1220, configured to return a bearer establishment response message to the macro access network node.

Optionally, the gateway node in this embodiment of the present invention may further include:

a small access network switching unit 1230, configured to: after the macro access network node initiates a bearer addition request to a second small access network node, receive a bearer modification request message sent by the macro access network node, where the bearer modification request message carries a fifth identifier, where the fifth identifier is used to enable the second small access network node to identify downlink user data forwarded by the gateway node; and return a second modification bearer response message to the macro access network node, so that the macro access network node sends a bearer deletion request message to the first small access network node.

For a specific operation process of each of the foregoing units/modules, refer to the method embodiments, and details are not described herein again.

The following describes an embodiment of a system for establishing a bearer, which is configured to execute a method for establishing a bearer according to the present invention. For a logical structure of the system, refer to FIG. 2. An embodiment of a system for establishing a bearer in an embodiment of the present invention includes:

a small access network node 201, a macro access network node 202, a gateway node 203, and a core network node 204.

The macro access network node 202 is configured to: after the core network node 204 initiates a bearer setup request, send a first identifier and a third identifier to the gateway node, where the first identifier is used to enable the core network node to identify uplink user data forwarded by the gateway node, and the third identifier is used to enable the small access network node to identify downlink user data forwarded by the gateway node; receive a second identifier and a fourth identifier that are sent by the gateway node, where the second identifier is used to enable the gateway node to identify uplink user data sent by the first small access network node, and the fourth identifier is used to enable the gateway node to identify downlink user data sent by the core network node; forward the second identifier to the first small access network node; and forward the fourth identifier to the core network node.

The gateway node 203 is configured to receive the first identifier and the third identifier that are sent by the macro access network node, and send the second identifier and the fourth identifier to the macro access network node, so that the macro access network node sends the second identifier to the first small access network node and sends the fourth identifier to the core network node.

Still referring to FIG. 2, another embodiment of a system for establishing a bearer in an embodiment of the present invention includes:

a small access network node 201, a macro access network node 202, a gateway node 203, and a core network node 204.

The macro access network node 202 is configured to: after the core network node 204 initiates a bearer setup request, receive a first identifier sent by the core network node and a third identifier sent by the small access network node, where the first identifier is used to enable the core network node to identify uplink user data forwarded by the gateway node, and the third identifier is used to enable the first small access network node to identify downlink user data forwarded by the gateway node; send the first identifier, a second identifier, the third identifier, and a fourth identifier to the gateway node, where the second identifier is used to enable the gateway node to identify uplink user data sent by the first small access network node, and the fourth identifier is used to enable the gateway node to identify downlink user data sent by the core network node; send the second identifier to the first small access network node; and send the fourth identifier to the core network node.

The gateway node 203 is configured to receive the first identifier, the second identifier, the third identifier, and the fourth identifier that are sent by the macro access network node.

An embodiment of the present invention further provides a computer storage medium. The computer storage medium may store a program. When being executed, the program includes all or some of the steps of the method for establishing a bearer as recorded in the foregoing method embodiments.

Figure 13:
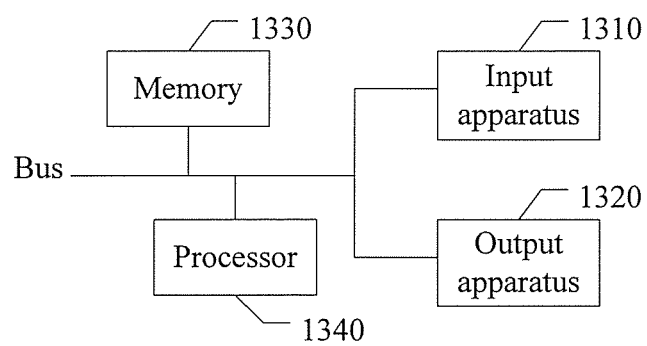
FIG. 13 is a schematic structural diagram of a gateway node according to the present invention.

Referring to FIG. 13, an embodiment of the present invention further provides a gateway node, which may include:

an input apparatus 1310, an output apparatus 1320, a memory 1330, and a processor 1340 (there may be one or more processors in the gateway node, and in FIG. 13, one processor is used as an example). In some embodiments of the present invention, the input apparatus 1310, the output apparatus 1320, the memory 1330, and the processor 1340 may be connected by using a bus or in other manners. In FIG. 13, a bus is used as an example.

The input apparatus executes the following step:

after a core network node initiates a bearer setup request, receiving, by the gateway node, a first identifier and a third identifier that are sent by a macro access network node.

The output apparatus executes the following step:

sending a second identifier and a fourth identifier to the macro access network node.

The memory stores the following content:

the first identifier, used to enable the core network node to identify uplink user data forwarded by the gateway node; the third identifier, used to enable a small access network node to identify downlink user data forwarded by the gateway node; the second identifier, used to enable the gateway node to identify uplink user data sent by the small access network node; and the fourth identifier, used to enable the gateway node to identify downlink user data sent by the core network node.

The processor executes the following steps:

using the first identifier to send uplink user data to the core network node, and using the third identifier to send downlink user data to the small access network node;

using the fourth identifier to identify uplink user data sent by the core network node, and using the second identifier to identify downlink user data sent by the small access network node; and allocating the second identifier to the small access network node, and allocating the fourth identifier to the core network node.

Referring to FIG. 13, an embodiment of the present invention further provides a macro access network node, which may include:

an input apparatus 1310, an output apparatus 1320, a memory 1330, and a processor 1340 (there may be one or more processors in the macro access network node, and in FIG. 13, one processor is used as an example). In some embodiments of the present invention, the input apparatus 1310, the output apparatus 1320, the memory 1330, and the processor 1340 may be connected by using a bus or in other manners. In FIG. 13, a connection by using a bus is used as an example.

The input apparatus executes the following step:

receiving a second identifier and a fourth identifier that are sent by a gateway node;

The output apparatus executes the following steps:

sending a first identifier and a third identifier to the gateway node;

forwarding the second identifier to a small access network node; and forwarding the fourth identifier to a core network node.

The memory stores the following content:

the first identifier, used to enable the core network node to identify uplink user data forwarded by the gateway node; the third identifier, used to enable the small access network node to identify downlink user data forwarded by the gateway node; the second identifier, used to enable the gateway node to identify uplink user data sent by the small access network node; and the fourth identifier, used to enable the gateway node to identify downlink user data sent by the core network node.

For specific operation processes of the macro access network node and the gateway node, refer to the foregoing method embodiments in FIG. 4 and FIG. 5, and details are not described herein again.

Referring to FIG. 13, an embodiment of the present invention further provides another macro access network node, which may include:

an input apparatus 1310, an output apparatus 1320, a memory 1330, and a processor 1340 (there may be one or more processors in the macro access network node, and in FIG. 13, one processor is used as an example). In some embodiments of the present invention, the input apparatus 1310, the output apparatus 1320, the memory 1330, and the processor 1340 may be connected by using a bus or in other manners. In FIG. 13, a connection by using a bus is used as an example.

The input apparatus executes the following step:

receiving a first identifier sent by a core network node and a third identifier sent by a small access network node.

The output apparatus executes the following steps:

sending the first identifier, a second identifier, the third identifier, and a fourth identifier to a gateway node;

sending the second identifier to the small access network node; and sending the fourth identifier to the core network node.

The memory stores the following content:

the first identifier, used to enable the core network node to identify uplink user data forwarded by the gateway node; the third identifier, used to enable the small access network node to identify downlink user data forwarded by the gateway node; the second identifier, used to enable the gateway node to identify uplink user data sent by the small access network node; and the fourth identifier, used to enable the gateway node to identify downlink user data sent by the core network node.

The processor executes the following step:

allocating the second identifier to the small access network node and the gateway node, and allocating the fourth identifier to the core network node and the gateway node.

Referring to FIG. 13, an embodiment of the present invention further provides another gateway node, which may include:

an input apparatus 1310, an output apparatus 1320, a memory 1330, and a processor 1340 (there may be one or more processors in the gateway node, and in FIG. 13, one processor is used as an example). In some embodiments of the present invention, the input apparatus 1310, the output apparatus 1320, the memory 1330, and the processor 1340 may be connected by using a bus or in other manners. In FIG. 13, a connection by using a bus is used as an example.

The input apparatus executes the following step:

after a core network node initiates a bearer setup request, receiving, by the gateway node, a first identifier, a second identifier, a third identifier, and a fourth identifier that are sent by a macro access network node.

The memory stores the following content:

the first identifier, used to enable the core network node to identify uplink user data forwarded by the gateway node; the third identifier, used to enable a small access network node to identify downlink user data forwarded by the gateway node; the second identifier, used to enable the gateway node to identify uplink user data sent by the small access network node; and the fourth identifier, used to enable the gateway node to identify downlink user data sent by the core network node.

The processor executes the following steps:

using the first identifier to send uplink user data to the core network node, and using the third identifier to send downlink user data to the small access network node; and using the fourth identifier to identify uplink user data sent by the core network node, and using the second identifier to identify downlink user data sent by the small access network node.

For specific operation processes of the macro access network node and the gateway node, refer to the foregoing method embodiments in FIG. 7 and FIG. 8, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a bearer, the method comprising:
    after a core network node initiates a bearer setup request, receiving, by a gateway node connected to the core network node through a S1 user plane interface S1-u, a first identifier and a third identifier that are sent by a macro access network node connected to the gateway node through a Sx interface and to the core network node through a S1 control interface S1-c, wherein the first identifier is used to enable the core network node to identify uplink user data forwarded by the gateway node through the S1 user plane interface S1-u, the first identifier having been previously sent by the core network node to the macro access network, the third identifier is used to enable a first small access network node connected to the gateway node through an X2 user plane interface X2-u and to the macro access network node by an X2 control plane interface X2-c to identify downlink user data forwarded by the gateway node through the X2 user plane interface X2-u, and the third identifier is sent by the first small access network node to the macro access network node; and
    sending, by the gateway node, a second identifier and a fourth identifier to the macro access network node, so that the macro access network node sends the second identifier to the first small access network node and sends the fourth identifier to the core network node, wherein the second identifier is used to enable the gateway node to identify uplink user data sent by the first small access network node through the X2 user plane interface X2-u, the fourth identifier is used to enable the gateway node to identify downlink user data sent by the core network node through the S1 user plane interface S1-u, and the second identifier and the fourth identifier are allocated by the gateway node.

2. The method according to claim 1, wherein receiving a first identifier and a third identifier that are sent by a macro access network node comprises:
    receiving a bearer establishment request message sent by the macro access network node, wherein the bearer establishment request message carries the first identifier; and
    receiving a first bearer modification request message sent by the macro access network node, wherein the first bearer modification request message carries the third identifier.

3. The method according to claim 2, wherein sending a second identifier and a fourth identifier to the macro access network node comprises:
    after receiving a bearer establishment request message sent by the macro access network node, returning a bearer establishment response message to the macro access network node, wherein the bearer establishment response message carries the second identifier; and
    after receiving a first bearer modification request message sent by the macro access network node, returning a first bearer modification response message to the macro access network node, wherein the first bearer modification response message carries the fourth identifier.

4. The method according to claim 1, wherein after receiving, by a gateway node, a first identifier and a third identifier that are sent by a macro access network node, the method further comprises:
    after the macro access network node initiates a bearer addition request to a second small access network node, receiving, by the gateway node, a second bearer modification request message sent by the macro access network node, wherein the second bearer modification request message carries a fifth identifier, wherein the fifth identifier is used to enable the second small access network node to identify downlink user data forwarded by the gateway node; and
    returning, by the gateway node, a second bearer modification response message to the macro access network node, so that the macro access network node sends a bearer deletion request message to the first small access network node.

5. The method according to claim 4, wherein:
    the second bearer modification request message comprises a sixth identifier used to enable the second small access network node to identify downlink user data forwarded by the gateway node but is not successfully sent by the first small access network node; and
    the second bearer modification response message comprises a seventh identifier used to enable the gateway node to identify data sent by the first small access network node but is not successfully sent.

6. A method for establishing a bearer, the method comprising:
    after a core network node initiates a bearer setup request, sending, by a macro access network node connected to the core network node through a S1 control plane interface S1-c, a first identifier and a third identifier to a gateway node connected to the macro access network node by a Sx interface and to the core network node through a S1 user plane interface S1-u, wherein the first identifier is used to enable the core network node to identify uplink user data forwarded by the gateway node through the S1 user plane interface S1-u, the first identifier having been previously sent by the core network node to the macro access network node, the third identifier is used to enable a first small access network node connected to the gateway node through the X2 user plane interface X2-u and connected to the macro access network node through a X2 control plane interface X2-c to identify downlink user data forwarded by the gateway node through the X2 user plane interface X-u, and the third identifier is sent by the first small access network node to the macro access network node;
    receiving, by the macro access network node, a second identifier and a fourth identifier that are sent by the gateway node, wherein the second identifier is used to enable the gateway node to identify uplink user data sent by the first small access network node through the X2 user plane interface X2-u, the fourth identifier is used to enable the gateway node to identify downlink user data sent by the core network node through the S1 user plane interface S1-u, and the second identifier and the fourth identifier are allocated by the gateway node;

forwarding, by the macro access network node, the second identifier to the first small access network node through the X2 control interface X2-c; and forwarding, by the macro access network node, the fourth identifier to the core network node after receipt from the gateway node.

7. The method according to claim 6, wherein before sending, by a macro access network node, a first identifier and a third identifier to a gateway node, the method further comprises:

receiving, by the macro access network node, a bearer setup request message sent by the core network node, wherein the bearer setup request message carries the first identifier.

8. The method according to claim 7, wherein:

forwarding, by the macro access network node, the second identifier to the first small access network node comprises:

sending a first bearer addition request message to the first small access network node, wherein the first bearer addition request message carries the second identifier; and forwarding the fourth identifier to the core network node comprises:

sending a bearer setup response message to the core network node, wherein the bearer setup response message carries the fourth identifier.

9. The method according to claim 6, wherein sending a first identifier and a third identifier to a gateway node comprises:

sending a bearer establishment request message to the gateway node, wherein the bearer establishment request message carries the first identifier; and sending a first bearer modification request message to the gateway node, wherein the first bearer modification request message carries the third identifier.

10. The method according to claim 9, wherein receiving a second identifier and a fourth identifier that are sent by the gateway node comprises:

after sending a bearer establishment request message to the gateway node, receiving a bearer establishment response message returned by the gateway node, wherein the bearer establishment response message carries the second identifier; and after sending a first bearer modification request message to the gateway node, receiving a first bearer modification response message returned by the gateway node, wherein the first bearer modification response message carries the fourth identifier.

11. The method according to claim 6, wherein after sending, by a macro access network node, a first identifier and a third identifier to a gateway node, the method further comprises:

sending, by the macro access network node, a second bearer addition request message to a second small access network node, wherein the second bearer addition request message carries the second identifier;

receiving, by the macro access network node, a second bearer addition response message returned by the second small access network node, wherein the second bearer addition response message carries a fifth identifier used to enable the second small access network node to identify downlink user data forwarded by the gateway node;

sending, by the macro access network node, a second bearer modification request message to the gateway node, wherein the second bearer modification request message carries the fifth identifier;

receiving, by the macro access network node, a second bearer modification response message returned by the gateway node; and sending, by the macro access network node, a bearer deletion request message to the first small access network node.

12. A gateway node, comprising:

a receiver, configured to: after a core network node connected to the gateway node through a S1 user interface S1-u initiates a bearer setup request, receive a first identifier and a third identifier that are sent by a macro access network node connected to the gateway through a Sx interface and connected to the core network node through a S1 control interface S1-c, wherein the first identifier is used to enable the core network node to identify uplink user data forwarded by the gateway node through the S1 user interface S1-u, the first identifier having been previously sent by the core network node to the macro access network node, the third identifier is used to enable a first small access network node connected to the gateway node through an X2 user interface X2-u and connected to the macro access network node through the X2 control interface X2-c to identify downlink user data forwarded by the gateway node through the X2 user interface X2-u, and the third identifier is sent by the first small access network node to the macro access network node; and a transmitter, configured to send a second identifier and a fourth identifier to the macro access network node, so that the macro access network node sends the second identifier to the first small access network node through the X2 control interface X2-c and sends the fourth identifier to the core network node, wherein the second identifier is used to enable the gateway node to identify uplink user data sent by the first small access network node through the X2 user interface X2-u, the fourth identifier is used to enable the gateway node to identify downlink user data sent by the core network node through the S1 user interface S1-u, and the second identifier and the fourth identifier are allocated by the gateway node.

13. The gateway node according to claim 12, wherein:

the receiver is configured to:

receive a bearer establishment request message sent by the macro access network node, wherein the bearer establishment request message carries the first identifier, and receive a first bearer modification request message sent by the macro access network node, wherein the first bearer modification request message carries the third identifier; and the transmitter is configured to:

after the bearer establishment request message sent by the macro access network node is received, return a bearer establishment response message to the macro access network node, wherein the bearer establishment response message carries the second identifier, or after the first bearer modification request message sent by the macro access network node is received, return a first bearer modification response message to the macro access network node, wherein the first bearer modification response message carries the fourth identifier.

14. The gateway node according to claim 12, wherein the receiver is further configured to:

after the macro access network node initiates a bearer addition request to a second small access network node, receive a second bearer modification request message sent by the macro access network node, wherein the second bearer modification request message carries a fifth identifier used to enable the second small access network node to identify downlink user data forwarded by the gateway node; and return a second bearer modification response message to the macro access network node, so that the macro access network node sends a bearer deletion request message to the first small access network node.

15. A macro access network node, comprising:

a transmitter, configured to: after a core network node connected to the macro access network node through a S1 control interface S1-c initiates a bearer setup request, send a first identifier and a third identifier to a gateway node connected to the macro access network node through a Sx interface, wherein the first identifier is used to enable the core network node to identify uplink user data forwarded by the gateway node through a S1 user interface S1-u, the first identifier having been previously sent by the core network node to the macro access network node, the third identifier is used to enable a first small access network node connected to the gateway node through the X2 user interface X2-u to identify downlink user data forwarded by the gateway node through the X2 user interface X2-u, and the third identifier is sent by the first small access network node to the macro access network node;

a receiver, configured to receive a second identifier and a fourth identifier that are sent by the gateway node, wherein the second identifier is used to enable the gateway node to identify uplink user data sent by the first small access network node through the X2 user interface X2-u, the fourth identifier is used to enable the gateway node to identify downlink user data sent by the core network node through the S1 user interface S1-u, and the second identifier and the fourth identifier are allocated by the gateway node; and a processor, configured to:

forward the second identifier to the first small access network node through the X2 control interface X2-c, and forward the fourth identifier to the core network node after receipt from the gateway node.

16. The macro access network node according to claim 15, wherein:

the transmitter is configured to:
 send a bearer establishment request message to the gateway node, wherein the bearer establishment request message carries the first identifier, and
 send a first bearer modification request message to the gateway node, wherein the first bearer modification request message carries the third identifier;

the receiver is configured to:
 after the bearer establishment request message is sent to the gateway node, receive a bearer establishment response message returned by the gateway node, wherein the bearer establishment response message carries the second identifier, or
 after the first bearer modification request message is sent to the gateway node, receive a first bearer modification response message returned by the gateway node, wherein the first bearer modification response message carries the fourth identifier.

17. The macro access network node according to claim 15, wherein:

the processor is configured to send a first bearer addition request message to the first small access network node, wherein the first bearer addition request message carries the second identifier; and the transmitter is configured to send a bearer setup response message to the core network node, wherein the bearer setup response message carries the fourth identifier.

18. The macro access network node according to claim 15, wherein:

the transmitter is further configured to send a second bearer addition request message to a second small access network node, wherein the second bearer addition request message carries the second identifier;

the receiver is further configured to receive a second bearer addition response message returned by the second small access network node, wherein the second bearer addition response message carries a fifth identifier used to enable the second small access network node to identify downlink user data forwarded by the gateway node;

the transmitter is further configured to send a second bearer modification request message to the gateway node, wherein the second bearer modification request message carries the fifth identifier;

the receiver is further configured to receive a second bearer modification response message returned by the gateway node; and the transmitter is further configured to send a bearer deletion request message to the first small access network node.

19. A method for establishing a bearer, the method comprising:

after a core network node initiates a bearer setup request, receiving, by a gateway node, a first identifier and a third identifier that are sent by a macro access network node, wherein the first identifier is used to enable the core network node to identify uplink user data forwarded by the gateway node, the first identifier is sent by the core network node to the macro access network node, the third identifier is used to enable a first small access network node to identify downlink user data forwarded by the gateway node, and the third identifier is sent by the first small access network node to the macro access network node; and sending, by the gateway node, a second identifier and a fourth identifier to the macro access network node, so that the macro access network node sends the second identifier to the first small access network node and sends the fourth identifier to the core network node, wherein the second identifier is used to enable the gateway node to identify uplink user data sent by the first small access network node, the fourth identifier is used to enable the gateway node to identify downlink user data sent by the core network node, and the second identifier and the fourth identifier are allocated by the gateway node;

wherein after receiving, by a gateway node, a first identifier and a third identifier that are sent by a macro access network node, the method further comprises:

after the macro access network node initiates a bearer addition request to a second small access network node, receiving, by the gateway node, a second bearer modification request message sent by the macro access network node, wherein the second bearer modification request message carries a fifth identifier, wherein the fifth identifier is used to enable the second small access network node to identify downlink user data forwarded by the gateway node; and returning, by the gateway node, a second bearer modification response message to the macro access network node, so that the macro access network node sends a bearer deletion request message to the first small access network node; and wherein:
- the second bearer modification request message comprises a sixth identifier used to enable the second small access network node to identify downlink user data forwarded by the gateway node but is not successfully sent by the first small access network node; and
- the second bearer modification response message comprises a seventh identifier used to enable the gateway node to identify data sent by the first small access network node but is not successfully sent.

* * * * *